US008817645B2

(12) United States Patent
Rui et al.

(10) Patent No.: US 8,817,645 B2
(45) Date of Patent: Aug. 26, 2014

(54) METHODS AND SYSTEMS FOR ESTIMATING NETWORK AVAILABLE BANDWIDTH USING PACKET PAIRS AND SPATIAL FILTERING

(75) Inventors: Yong Rui, Sammamish, WA (US); Andres Vega-Garcia, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/300,027

(22) Filed: Nov. 18, 2011

(65) Prior Publication Data

US 2012/0063347 A1 Mar. 15, 2012

Related U.S. Application Data

(62) Division of application No. 10/686,160, filed on Oct. 15, 2003, now Pat. No. 8,068,436.

(51) Int. Cl.
*H04L 12/26* (2006.01)
(52) U.S. Cl.
CPC ............ *H04L 43/0882* (2013.01); *H04L 43/022* (2013.01); *H04L 43/0852* (2013.01); *H04L 43/045* (2013.01)
USPC ........................................................ 370/252
(58) Field of Classification Search
None
See application file for complete search history.

(56) References Cited

U.S. PATENT DOCUMENTS

| 5,359,593 | A | 10/1994 | Derby et al. |
| 5,815,492 | A | 9/1998 | Berthaud et al. |
| 5,881,050 | A | 3/1999 | Chevalier et al. |
| 5,884,037 | A | 3/1999 | Aras et al. |
| 5,949,758 | A | 9/1999 | Kober |
| 5,982,916 | A | 11/1999 | Kuhn |
| 6,011,776 | A | 1/2000 | Berthaud et al. |
| 6,011,804 | A | 1/2000 | Bertin et al. |
| 6,072,809 | A | 6/2000 | Agrawal et al. |
| 6,233,017 | B1 | 5/2001 | Chaddha |
| 6,262,974 | B1 | 7/2001 | Chevalier et al. |
| 6,337,881 | B1 | 1/2002 | Chaddha |
| 6,392,705 | B1 | 5/2002 | Chaddha |
| 6,563,517 | B1 | 5/2003 | Bhagwat et al. |
| 6,564,262 | B1 | 5/2003 | Chaddha |
| 6,596,341 | B1 | 7/2003 | Gui et al. |

(Continued)

OTHER PUBLICATIONS

Final Office Action for U.S. Appl. No. 10/686,160, mailed on May 26, 2010, Yong Rui, "Methods and Systems for Estimating Network Available Bandwidth Using Packet Pairs and Spatial Filtering", 16 pages.

(Continued)

*Primary Examiner* — Rhonda Murphy
(74) *Attorney, Agent, or Firm* — Stephen A. Wight; Carole Boelitz; Micky Minhas

(57) ABSTRACT

Estimation of available bandwidth on a network uses packet pairs and spatially filtering. Packet pairs are transmitted over the network. The dispersion of the packet pairs is used to generate samples of the available bandwidth, which are then classified into bins to generate a histogram. The bins can have uniform bin widths, and the histogram data can be aged so that older samples are given less weight in the estimation. The histogram data is then spatially filtered. Kernel density algorithms can be used to spatially filter the histogram data. The network available bandwidth is estimated using the spatially filtered histogram data. Alternatively, the spatially filtered histogram data can be temporally filtered before the available bandwidth is estimated.

19 Claims, 17 Drawing Sheets

(56) References Cited

U.S. PATENT DOCUMENTS

| | | | |
|---|---|---|---|
| 6,850,541 B2 | 2/2005 | Gross | |
| 6,912,200 B2* | 6/2005 | Halme | 370/238 |
| 7,003,153 B1 | 2/2006 | Kerofsky | |
| 7,012,900 B1* | 3/2006 | Riddle | 370/252 |
| 7,035,461 B2 | 4/2006 | Luo et al. | |
| 7,047,309 B2* | 5/2006 | Baumann et al. | 709/232 |
| 7,130,268 B2* | 10/2006 | Mascolo | 370/232 |
| 7,180,858 B1 | 2/2007 | Roy et al. | |
| 7,203,165 B1* | 4/2007 | Kowalewski | 370/230 |
| 7,284,051 B1* | 10/2007 | Okano et al. | 709/226 |
| 7,693,058 B2* | 4/2010 | Cheung et al. | 370/231 |
| 2002/0169880 A1 | 11/2002 | Loguinov et al. | |
| 2004/0092281 A1 | 5/2004 | Burchfiel | |
| 2005/0066033 A1* | 3/2005 | Cheston et al. | 709/225 |
| 2005/0071876 A1 | 3/2005 | van Beek | |
| 2005/0083849 A1 | 4/2005 | Rui et al. | |

OTHER PUBLICATIONS

Final Office Action for U.S. Appl. No. 10/686,160, mailed on Dec. 23, 2008, Yong Rui, "Methods and Systems for Estimating Network Available Bandwidth Using Packet Pairs and Spatial Filtering", 15 pages.

Matoba, et al., "Improving Bandwidth Estimation for Internet Links by Statistical Methods", IEICE Trans. on Communication, vol. E00-13, No. 6, Jun. 2001, pp. 1-12.

Non-Final Office Action for U.S. Appl. No. 10/686,160, mailed on Mar. 10, 2011, Yong Rui, "Methods and Systems for Estimating Network Available Bandwidth Using Packet Pairs and Spatial Filtering", 6 pages.

Non-Final Office Action for U.S. Appl. No. 10/686,160, mailed on Mar. 17, 2009, Yong Rui, "Methods and Systems for Estimating Network Available Bandwidth Using Packet Pairs and Spatial Filtering", 15 pages.

Non-Final Office Action for U.S. Appl. No. 10/686,160, mailed on May 1, 2008, Yong Rui, "Methods and Systems for Estimating Network Available Bandwidth Using Packet Pairs and Spatial Filtering", 16 pages.

Non-Final Office Action for U.S. Appl. No. 10/686,160, mailed on Oct. 7, 2010, Yong Rui, "Methods and Systems for Estimating Network Available Bandwidth Using Packet Pairs and Spatial Filtering", 16 pages.

Non-Final Office Action for U.S. Appl. No. 10/686,160, mailed on Oct. 30, 2009, Yong Rui, "Methods and Systems for Estimating Network Available Bandwidth Using Packet Pairs and Spatial Filtering", 15 pages.

Pereira, et al., "Network Performance Analysis of an Adaptive OSPF Routing Strategy—Effective Bandwidth Estimation," IEEE International Telecommunication Symposium—ITS 2002, Sep. 2002, 6 pages.

Prasad, et al., "Bandwidth Estimation: Metrics, Measurement Techniques, and Tools", IEEE Network, SciDac Program of the US Department of Energy, <<http://www.cc.gatech.edu/fac/constantinos.dovrolis/papers/netdovd248.pdf>>, Jun. 2003, pp. 1-12.

Towers, "Kernel Probability Density Estimation Methods", Advanced Statistical Techniques in Particle Physics, <<http://www.ippp.dur.ac.uk/statistics/papers/towers_pde.ps.gz>>, Mar. 2002, pp. 107-111.

* cited by examiner

METHODS AND SYSTEMS FOR ESTIMATING NETWORK AVAILABLE BANDWIDTH USING PACKET PAIRS AND SPATIAL FILTERING

CROSS-REFERENCE TO RELATED APPLICATIONS

This application is a divisional of, and claims priority to, commonly-owned U.S. Pat. No. 8,068,436, entitled "METHODS AND SYSTEMS FOR ESTIMATING NETWORK AVAILABLE BANDWIDTH USING PACKET PAIRS AND SPATIAL FILTERING", filed on Oct. 15, 2003, which is incorporated herein in its entirety by reference.

FIELD

Various embodiments described below relate generally to networks and, more particularly but not exclusively to, methods and apparatus for estimating available bandwidth in networks.

BACKGROUND

Networks can be used to interconnect several computers to allow a computer connected to the network to transfer data to another computer attached to the network. FIG. 1 shows an example of a system in which a computer 101 and a computer 103 can transfer data between each other through a network 105. The quality of service (QoS), data losses, and other performance parameters of a network generally depend in part on available network bandwidth of network 105 as it is currently configured. Some network applications are used to estimate the bandwidth available on network 105 during operation so that network 105 can be properly dimensioned to provide the desired performance.

However, some conventional techniques for estimating network available bandwidth consume a significant amount of bandwidth (e.g., packet pair trains), thereby undesirable reducing the amount of bandwidth that could otherwise be used for "real" network traffic. This bandwidth loss can be acceptable in such network dimensioning applications (which are performed relatively infrequently), but unacceptable in other applications. Further, some conventional techniques do not conform to the protocol being used on the network for "real" traffic, which may detrimentally impact network performance. Still further, conventional techniques generally are neither designed nor suitable for accurately tracking network available bandwidth in a network having a relatively quick and complexly changing available bandwidth. Applications that require such bandwidth estimation performance are described below.

SUMMARY

In accordance with aspects of the various described embodiments, a method and system to estimate the available bandwidth on a network is provided. In one aspect, the available bandwidth is estimated using packet pairs transmitted over the network. The dispersion of the packet pairs is used to generate samples of the available bandwidth, which are then classified into bins to generate a histogram. In one embodiment, the histogram bins have uniform bin widths. In a further refinement, the histogram data can be aged so that older samples are given less weight in the estimation. The histogram data is then spatially filtered, which can reduce the impact of the boundary effect. In some embodiments, kernel density algorithms are used to spatially filter the histogram data. The network available bandwidth can then estimated using the spatially filtered histogram data.

In another aspect, the spatially filtered histogram data is then temporally filtered. In one embodiment, when the spatially-filtered histogram data indicates that the network available bandwidth is decreasing, the temporal filtering gives more weight to the current spatially-filtered histogram data than to the previous available bandwidth estimation so that the current available bandwidth estimation will decrease relatively quickly. However, the when the spatially-filtered histogram data indicates that the network available bandwidth is increasing, the temporal filtering gives less weight to the current spatially-filtered histogram data than to the previous available bandwidth estimation so that the current available bandwidth estimation will increase relatively slowly. This aspect can reduce the risk of overestimating the network available bandwidth.

In another aspect, the histogram data can be organized using a hierarchical bin structure. The hierarchical bin structure can be designed to provide higher resolution of the estimation at desired bandwidth ranges. Lower resolution estimates can be used in the ranges of less interest to reduce computational loading. For example, in real time streaming applications, the higher resolution can be applied to bandwidth ranges at which the streaming source changes codecs so that an optimal codec can be used to encode the data. In addition, the hierarchical bin structure is robust to small sample size. That is, the hierarchical bin structure provides a relatively small number of bins at the top level. Thus, the available bandwidth can be estimated with a relatively small number of samples and be relatively accurate. However, if a relatively large number of bins is used, a relatively small number of samples will result in a noisy bandwidth estimation.

In still another aspect, the packet pairs from which the samples of the available bandwidth are generated can be transmitted at a variable rate. In one embodiment, the packet pairs are transmitted at a relatively high rate at the beginning of a data transfer session to more quickly generate statistically useful histogram data. The packet pair transmission rate can then be reduced to free up bandwidth for data transmission.

In yet another aspect, the type of network connection through which the data destination receives the data transfer is determined using the packet pairs. The packet pairs include round trip time (RTT) information. Samples of the available bandwidth are then generated from the packet pairs as described above. The network connection type is then determined using the available bandwidth sample and its associated RTT.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
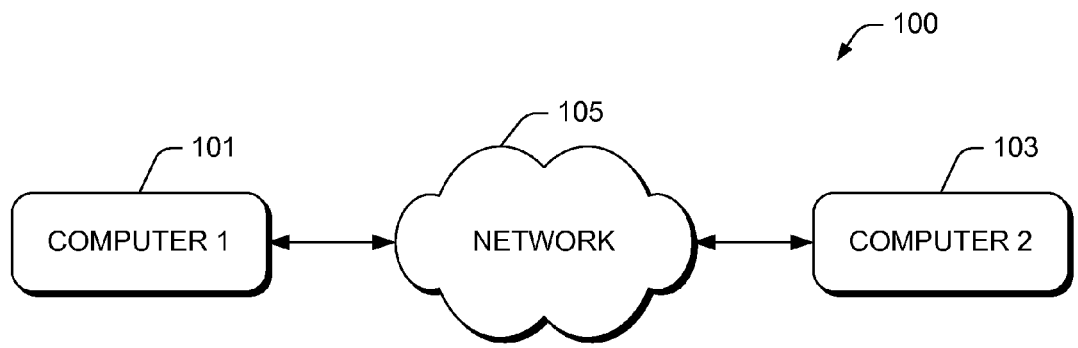
FIG. 1 (Prior Art) is a simplified block diagram illustrating a data flow in a network.
Figure 2:
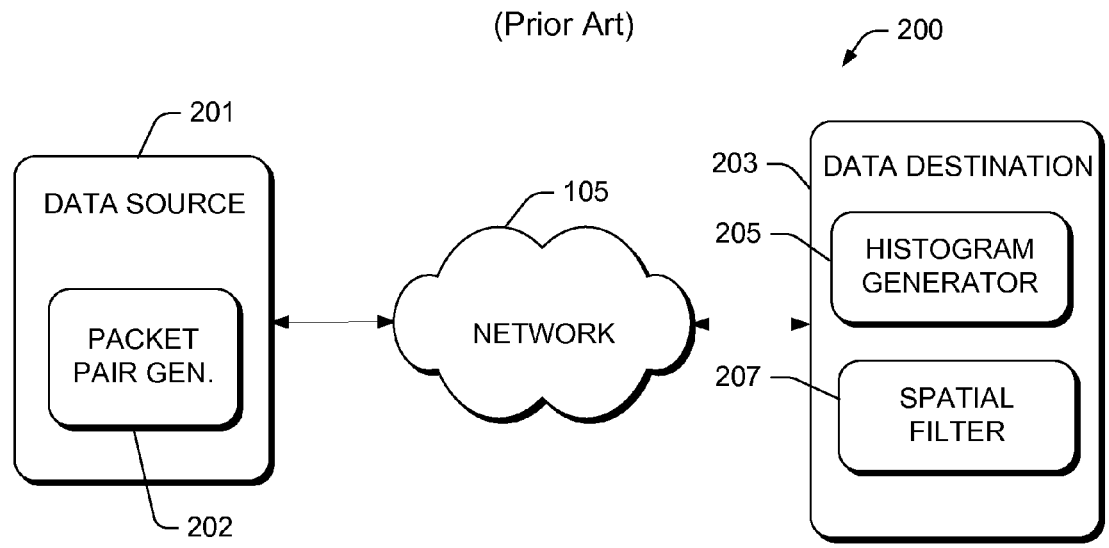
FIG. 2 is a block diagram illustrating a network system having network available bandwidth estimation, according to one embodiment.

FIG. 2 illustrates a system 200 with network available bandwidth estimation according to one embodiment. In this embodiment, system 200 includes a data source 201 having a packet pair generator 202, and a data destination 203 having a histogram generator 205 and a spatial filter 207. Data source 201 can send data to data destination 203 via network 105.

In one embodiment, data source 201 is a server that can provide streaming or real time data (e.g., compressed audio or video data); data destination 203 is a client (e.g., a personal computer) that requested the data, and network 105 is the Internet. In other embodiments, data source 201 and data destination 203 can be other types of devices, network 105 can be another type of network (e.g., a local area network). Further, in this example embodiment, data source 201 provides the data according to the Real-time Transport Protocol (RTP), as defined in Request for Comments (RFC) 3550, Jul. 30 2003, by the Internet Engineering Task Force (IETF), also referred to herein as the RTP Standard. Different protocols can be used in other embodiments.

In this embodiment, packet pair generator 202 is implemented as a software component executed by data source 201, with packet pair generator 202 controlling the timing of when the packet pairs are transmitted by the physical layer. Similarly, in this embodiment, histogram generator 205 and spatial filter 207 are software components executed by data destination 203 to process packet pairs received from data source 201 via network 105.

Figure 3:
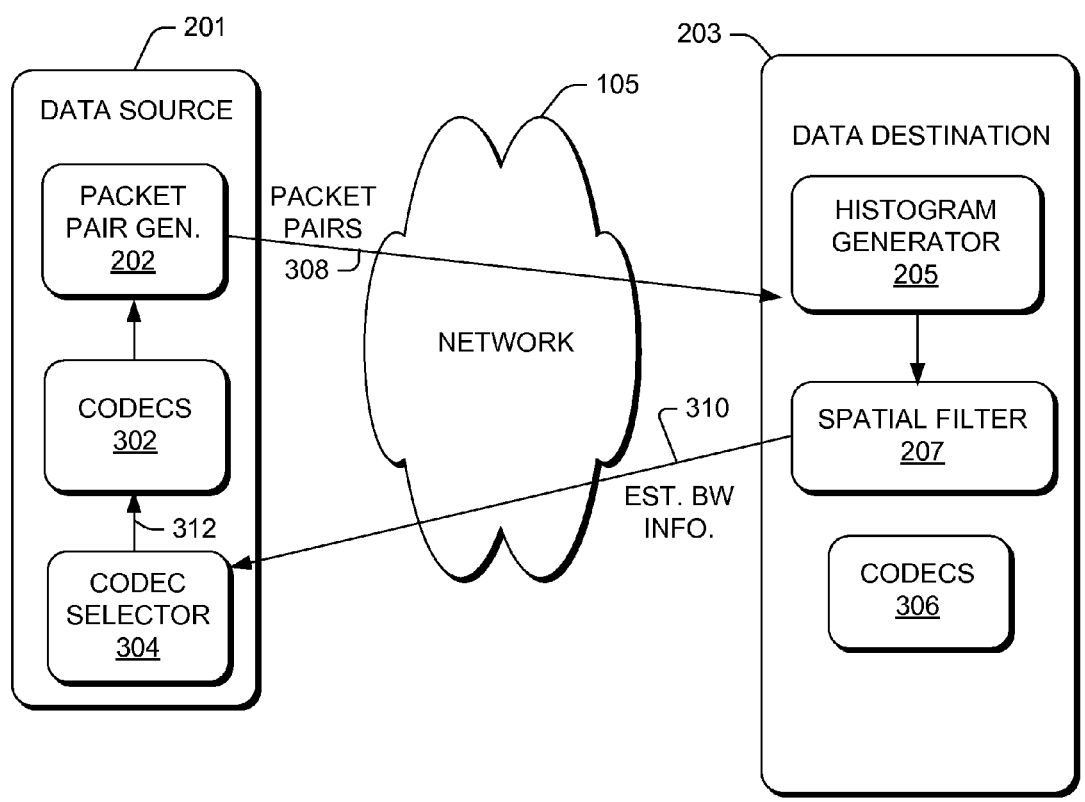
FIG. 3 is a diagram illustrating information flow in a network system having network available bandwidth estimation, according to an embodiment.

FIG. 3 illustrates information flow in system 200 (FIG. 2), according to one embodiment. In this embodiment, data source 201 includes a set of coder/decoders (codecs) 302 and a codec selector 304 in addition to packet pair generator 202. Data destination 203 includes a set of codecs 306, which includes the codecs of set 302. In other embodiments, codec set 302 may have different codecs than codec set 306 (e.g., codec set 302 may be a subset of codec set 306 in some embodiments).

Data source 201 transmits streaming or real time data to data destination 203 in compressed form using a selected codec of codec set 302. For audio or video data, the quality of the decompressed audio or video output depends at least in part on the codec that was used to compress and decompress the original audio or video data. Typically, codecs providing higher quality streaming and real time data require more network bandwidth than codecs providing lower quality output. If the network available bandwidth is too small for the codec, packets are more likely to be delayed and/or lost, audio output can be "choppy" and video output can be "blocky", thereby resulting in a poor listener/viewer experience. In addition, in this embodiment, data source 201 also inserts packet pairs in the data stream, with timing as set by packet pair generator 202. An arrow 308 indicates this data stream.

Data destination 203, in this embodiment, estimates network available bandwidth using the packet pairs. In this embodiment, histogram generator 205 and spatial filter 207 process the packet pairs to estimate the available bandwidth of network 105. Data destination 203 then provides this estimate to data source 201 as indicated by arrow 310.

In estimating network available bandwidth in one embodiment of data destination 203, histogram generator 205 receives the packet pairs transmitted by data source 201. For each received packet pair, histogram generator 205 calculates a network available bandwidth sample as a function of the dispersion of the packet pair. Each sample (representing an estimation of the network available bandwidth) is then classified into one of a set of predetermined bins. In other embodiments, each sample can be classified into one or more bins of a set of predetermined bins. The number of samples in each bin (i.e., the bin count) can be displayed as a histogram (see FIG. 8, for example).

In this embodiment, spatial filter 207 then filters the histogram data to "smooth" the histogram. For example, the histogram data can be spatially filtered by calculating a weighted average for each bin using the bin counts of that bin and predetermined neighboring bins to generate a smoothed bin count for each bin. In alternative embodiments, the number of neighboring bins can be determined "on the fly" to generate the smoothed bin counts.

In one embodiment, the smoothed histogram data is used to estimate the network available bandwidth by spatially filtering an average of the samples in the bin with the largest smoothed bin count. This smoothed average of the samples in the bin with the largest smoothed bin count then serves as the estimated network available bandwidth. In other embodiments, different spatial filtering algorithms can be used and/or additional filtering techniques can be applied. In still other embodiments, the non-smoothed bin average can be used as the network available bandwidth estimation. The operation of data destination 203 in estimating network available bandwidth is described in more detail below in conjunction with FIG. 5 through FIG. 15.

Based on the estimated network available bandwidth, codec selector 304 then selects an appropriate codec of codec set 302 to compress/decompress the streaming or real time data, as indicated by arrow 312. Using novel packet pair processing techniques (described in more detail below), system 200 advantageously forms a control loop that adapts the bandwidth requirements of the data stream to the network available bandwidth and/or other factors of the particular application. For example, in some applications (e.g., video and audio applications), frequent changes in the data transmission bandwidth (i.e., codecs) tend to degrade the viewer's experience, so an additional factor may be codec changing frequency.

Figure 4:
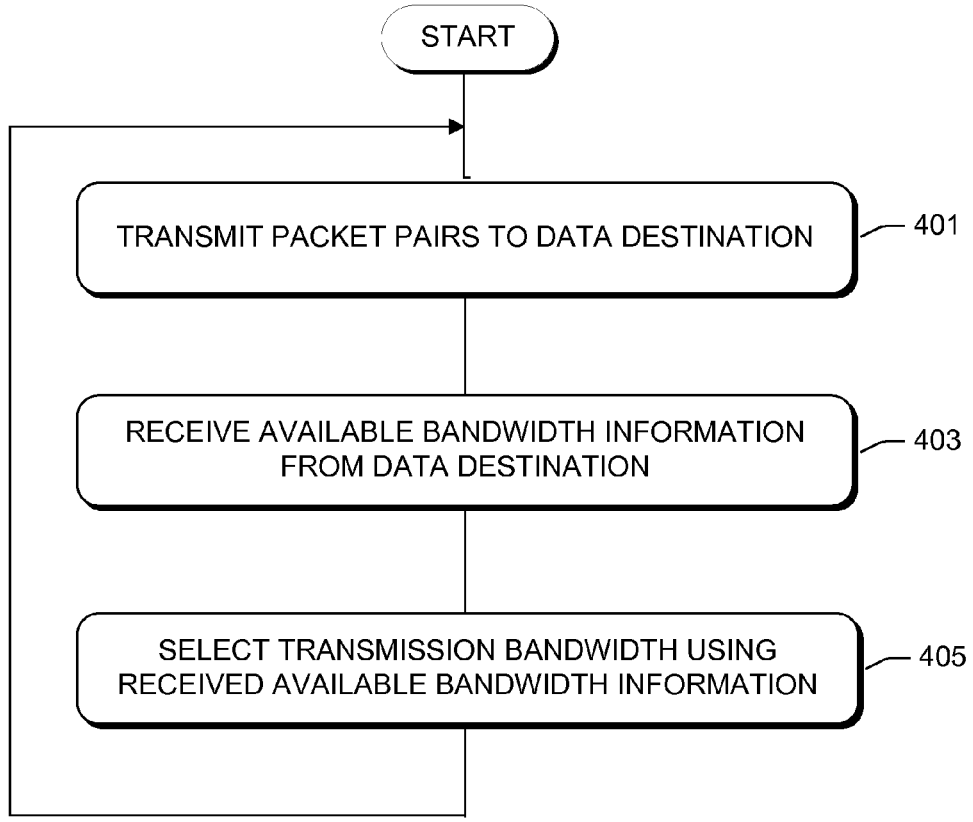
FIG. 4 is a flow diagram illustrating data source operational flow in estimating network available bandwidth, according to one embodiment.

FIG. 4 illustrates the operational flow of data source 201 (FIG. 2) in estimating network available bandwidth, according to one embodiment. In a block 401, data source 201 transmits packet pairs to data destination 203 (FIG. 2) via network 105 (FIG. 2). In one embodiment, packet pair generator 202 (FIG. 2) causes data source 201 to transmit the packet pairs at a substantially uniform rate. Each packet pair, in this embodiment, conforms to the Real-time Transport Control Protocol (RTCP), which is part of the aforementioned RTP Standard. In this context, a packet pair is a pair of RTCP packets that are transmitted back-to-back (i.e., the second packet immediately after the first packet).

Figure 4A:
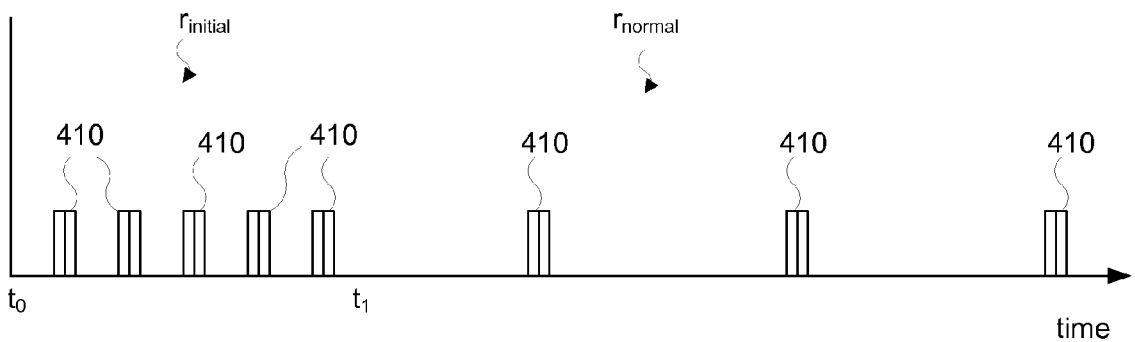
FIG. 4A is a diagram illustrating selectively variable-rate packet pair generation according to one embodiment.

In another embodiment, packet pair generator 202 causes data source 201 to transmit the packet pairs at a variable rate. For example, in one embodiment, packet pair generator 202 causes the packet pairs to be transmitted at a relatively high rate (e.g., at 250 millisecond intervals) at the beginning of a streaming or real time session. Then at a later point when the histogram contains sufficient samples to be useful, packet pair generator 202 reduces the rate (e.g., to 5000 millisecond intervals) to free up bandwidth for other uses. This example of variable rate packet generation is illustrated in FIG. 4A. In the time period between time $t_0$ and time $t_1$, packet pairs 410 are transmitted at a relatively high rate indicated as rate $r_{initial}$ in FIG. 4A. After time $t_1$, the packet pair transmission rate transitions to a relatively low rate (indicated as rate $r_{normal}$), continuing for the rest of the session. In other embodiments, the packet pair transmission rates can be changed using other criteria and can have values different from those described above.

Returning to FIG. 4, in a block 403, data source 201 receives information related to the network available bandwidth from data destination 203. In this embodiment, this available bandwidth information is an estimation of the network available bandwidth derived from dispersion of the packet pairs transmitted in block 301. Data destination 203 can provide the estimated network available bandwidth information to data source 201 via network 105. For example, in one embodiment, data destination 203 may transmit the information to data source 201 using session initiation protocol (SIP) packets when SIP is used as the signaling protocol. In other embodiments, the estimated network available bandwidth information may be transmitted via other channels or links. Various embodiments of estimating the network available bandwidth using packet pairs are described below in conjunction with FIG. 5 through FIG. 15A.

In a block 405, data source 201 then selects the data transmission bandwidth based on the estimated network available bandwidth information received in block 403. In one embodiment, codec selector 304 (FIG. 3) selects a codec of codec set 302 (FIG. 3) so that the data transmission bandwidth does not exceed the estimated network available bandwidth.

This operational flow then returns to block 401. Although the processes are illustrated as being performed sequentially, in application, some or all of the blocks can be performed in parallel.

Figure 5:
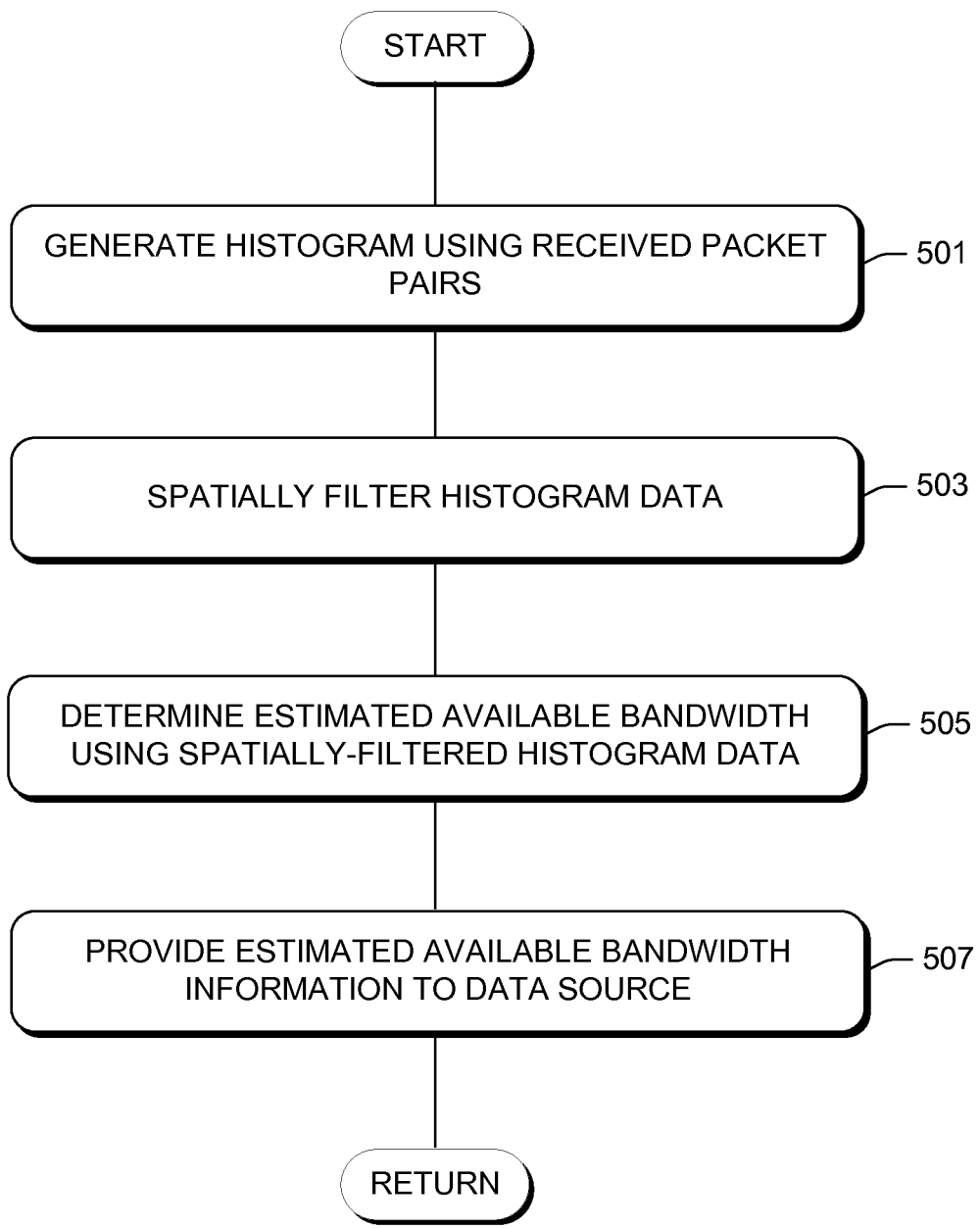
FIG. 5 is a flow diagram illustrating data destination operational flow in estimating network available bandwidth, according to one embodiment.

FIG. 5 illustrates operational flow of data destination 203 (FIG. 2) in estimating the available bandwidth of network 105 (FIG. 2), according to one embodiment. In a block 501, this embodiment of data destination 203 generates histogram data using information derived from packet pairs received from data source 201 (FIG. 2) via network 105 (FIG. 2). In this embodiment, histogram generator 205 (FIG. 2) calculates a network available bandwidth sample as a function of the dispersion (see FIG. 7) of each received packet pair. For example, the network available bandwidth sample can be calculated as the number of bits in the second packet of the packet pair divided by the time between the two packets of the packet pair. This sample is then classified into one of a set of predetermined bins covering the bandwidth range of interest (e.g., from zero to 10 Mbps) in the histogram. In this embodiment, histogram generator 205 tracks the number of samples in each bin. An embodiment of block 501 is described in more detail in conjunction with FIG. 6 below.

In a block 503, data destination 203 spatially filters the histogram data. In this embodiment, spatial filter 207 spatially filters the histogram data. As previously described, in one embodiment, spatial filter 207 filters the histogram by calculating a weighted average for each bin using the bin counts of that bin, together with predetermined (or determined "on the fly" in other embodiments) neighboring bins to generate a smoothed bin count for each bin. In some embodiments, kernel-based density estimation techniques are applied to the bin counts (rather than the samples themselves). Additional processing operations may be performed in some embodiments. For example, in some embodiments spatial filter 207 can also spatially filter an average of the samples in one or more bins. In other embodiments, different spatial filtering algorithms can be used and/or additional filtering techniques can be applied. An embodiment of block 503 is described in more detail in conjunction with FIG. 9 below.

The spatially filtered histogram data is then used to estimate the network available bandwidth in a block 505. In one embodiment, data destination 203 estimates the network available bandwidth by selecting the smoothed average of the samples in the bin with the largest smoothed bin count. In some embodiments, data destination 203 may estimate the network available bandwidth by selecting the raw (non-smoothed) average of the samples in the bin with the largest smoothed bin count. Additional processing operations may be performed in some embodiments. Embodiments of block 505 are described below in more detail in conjunction with FIG. 12 through FIG. 12C.

In a block 507, data destination 203 provides the estimated network available bandwidth to data source 201. In one embodiment, data destination 203 sends the estimation to data source 201 via network 105 in the form of packets conforming to the aforementioned RTP Standard. In other embodiments, different protocols can be used.

Figure 6:
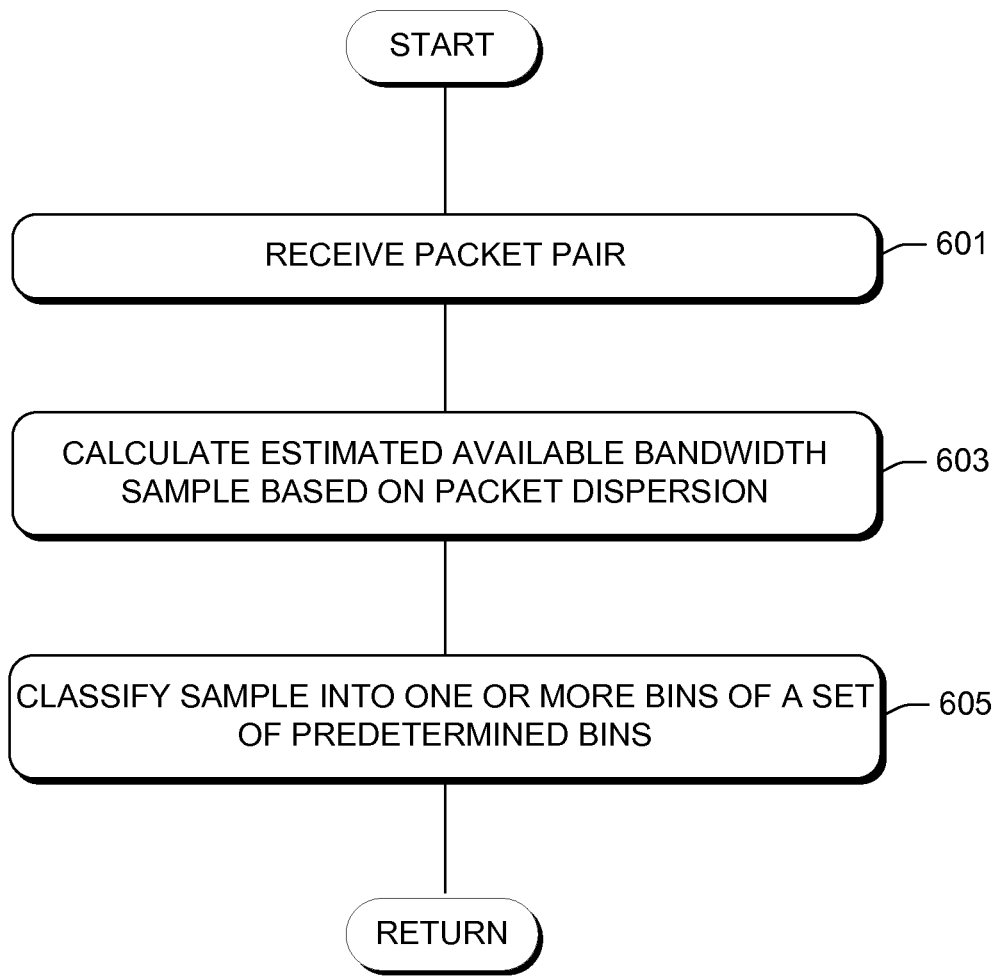
FIGS. 6 and 6A are flow diagrams illustrating operational flow in generating a histogram of estimated available bandwidth samples, according to two embodiments.

FIG. 6 illustrates operational flow in generating a histogram of estimated network available bandwidth samples (i.e., block 501 in FIG. 5), according to one embodiment. In a block 601, data destination 203 (FIG. 2) receives a packet pair. In this embodiment, data destination 203 receives the packet pair from data source 201 (FIG. 2) via network 105

(FIG. 2). In one embodiment, the packet pairs are generated as described above in conjunction with block 401 (FIG. 4).

Figure 7:
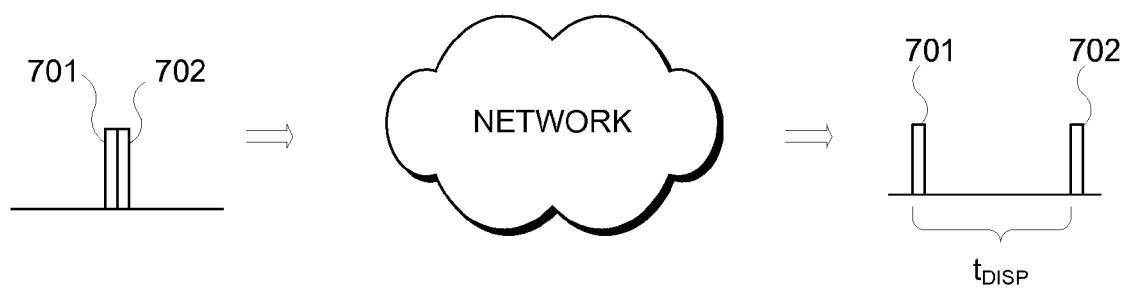
FIG. 7 is a diagram illustrating packet pair dispersion incurred during transmission through a network.

In a block 603, data destination 203 determines an estimated available bandwidth sample based on the dispersion of the received packet pair. FIG. 7 illustrates packet pair dispersion. In packet pair approaches, two packets 701 and 702 are transmitted over a network (e.g., network 105), with packet 702 immediately transmitted after packet 701 (so that the time between packets is essentially zero). As packets 701 and 702 propagate through network 105, the time between the packets increases, due at least in part to other traffic being carried by network 105. This increase in time separation between the two packets is referred to herein as dispersion. When received at the destination (e.g., data destination 203), the dispersion (indicated as $t_{DISP}$ in FIG. 7) can be used to calculate an estimated network available bandwidth sample. In this embodiment, histogram generator 205 (FIG. 2) calculates the estimated network available bandwidth sample by dividing the number of bits in packet 702 by $t_{DISP}$. In other embodiments, different methods of calculating an estimated available bandwidth sample from packet pair dispersion may be used.

Figure 8:
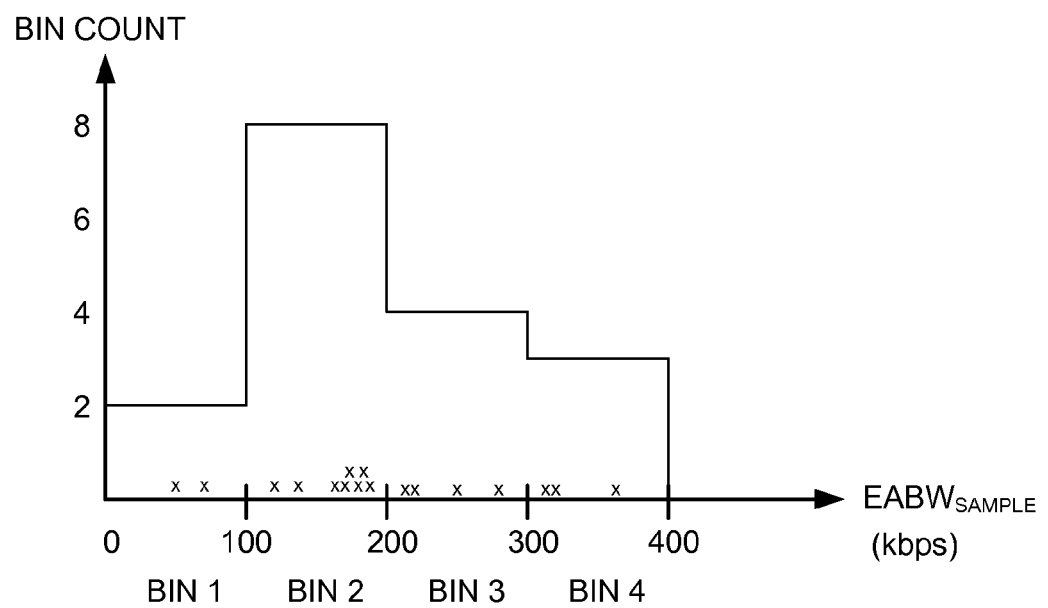
FIG. 8 is a diagram illustrating a histogram of available bandwidth estimation samples derived from packet pair dispersion, according to one embodiment.

Returning to FIG. 6, in a block 605, data destination 203 classifies the sample determined in block 603 into one or more bins of a set of bins. In one embodiment, the bins are of uniform size. For example, in one embodiment the bins are each 100 kbps (kilobits per second) wide, defining a range of network available bandwidth of 0 bps to 10 Mbps. In other embodiments, the bins may have a different uniform size, or the bins may be non-uniform in size. In addition, the bins can be overlapping or non-overlapping. FIG. 8 illustrates four bins of an example histogram. The bin count (i.e., the number of samples in a bin) is plotted for each bin. The horizontal axis of FIG. 8 represents the estimated available bandwidth of a sample ($EABW_{SAMPLE}$) as determined in block 603. Bins 1 through 4 each have a size of 100 kbps. In this example, two samples had an $EABW_{SAMPLE}$ of less than 100 kbps; eight samples had an $EABW_{SAMPLE}$ between 100 kbps and 200 kbps; four samples had an $EABW_{SAMPLE}$ between 200 kbps and 300 kbps, and so on. Such a histogram can be filtered as described above in conjunction with block 503 (FIG. 5). In one embodiment, only a predetermined number of the most recent samples are used to generate the histogram.

Figure 6A:
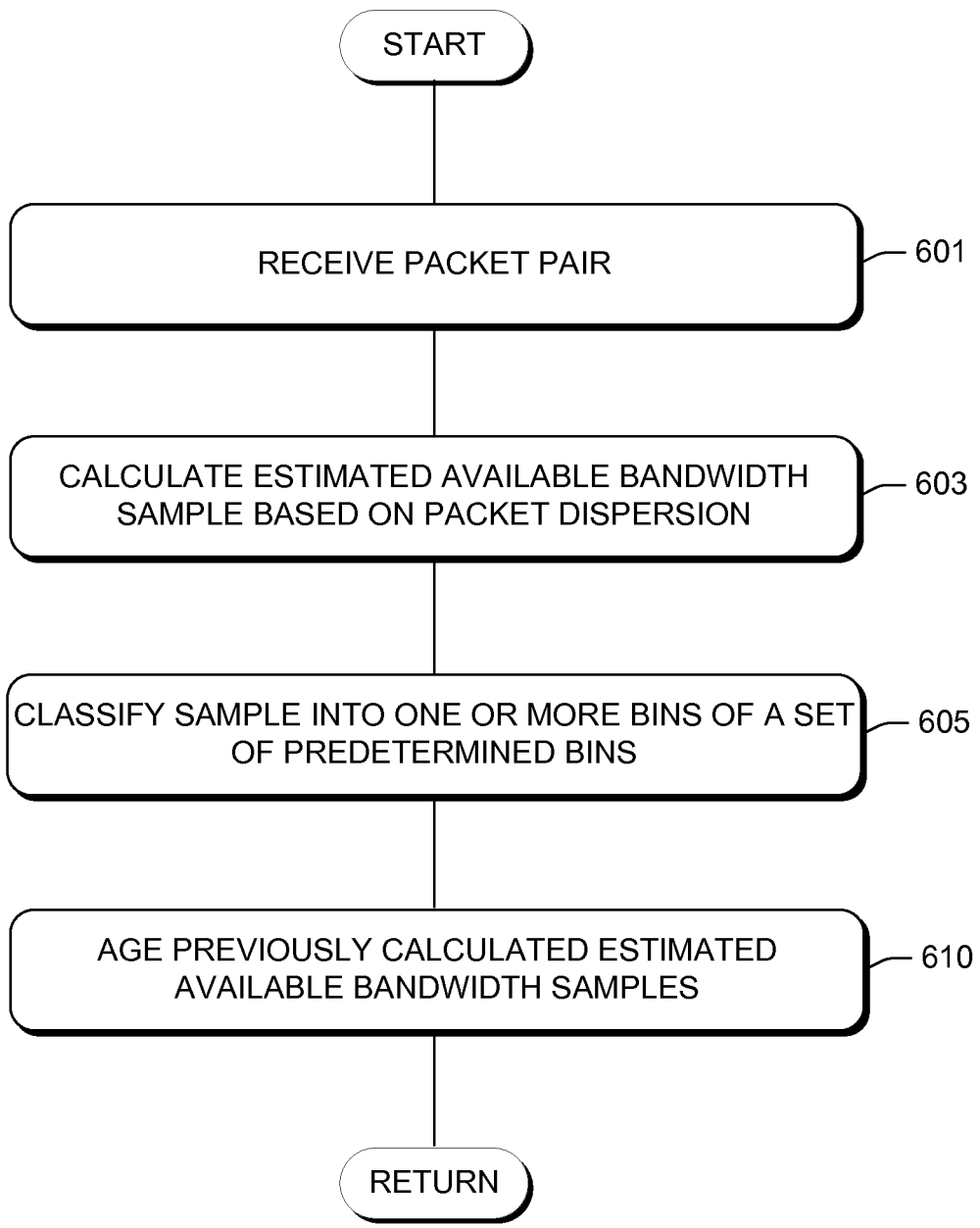

FIG. 6A illustrates operational flow in generating a histogram of estimated network available bandwidth samples, according to another embodiment. This embodiment is substantially similar to the embodiment of FIG. 6, with the additional processing. More particularly, this embodiment includes blocks 601, 603, and 605 as previously described in conjunction with FIG. 6. However, in addition, this embodiment includes a block 610 in which histogram generator 205 (FIG. 2) ages the samples.

In one embodiment of block 610, each time a sample is determined in block 603, all of the samples in each bin are reduced by some selected amount so that more recent samples are given more weight than older samples. For example, the most recent sample is given its full "weight" in the bin into which it was classified in block 605. That is, it contributes a "weight" of 1.0 to the bin count. However, the "weight" of the second most recent sample is reduced by the selected amount. In one example embodiment, the selected amount is a hundredth, so the second most recent sample only contributes a 0.99 to the bin count of the bin in which it was classified. Similarly, the third most recent sample contributes only 0.98 to the bin count of its bin, and so on. Thus, in this example embodiment, the effect of a sample is completely eliminated after histogram generator 207 receives 100 more samples. In other embodiments, different approaches may be used to age the samples.

Figure 9:
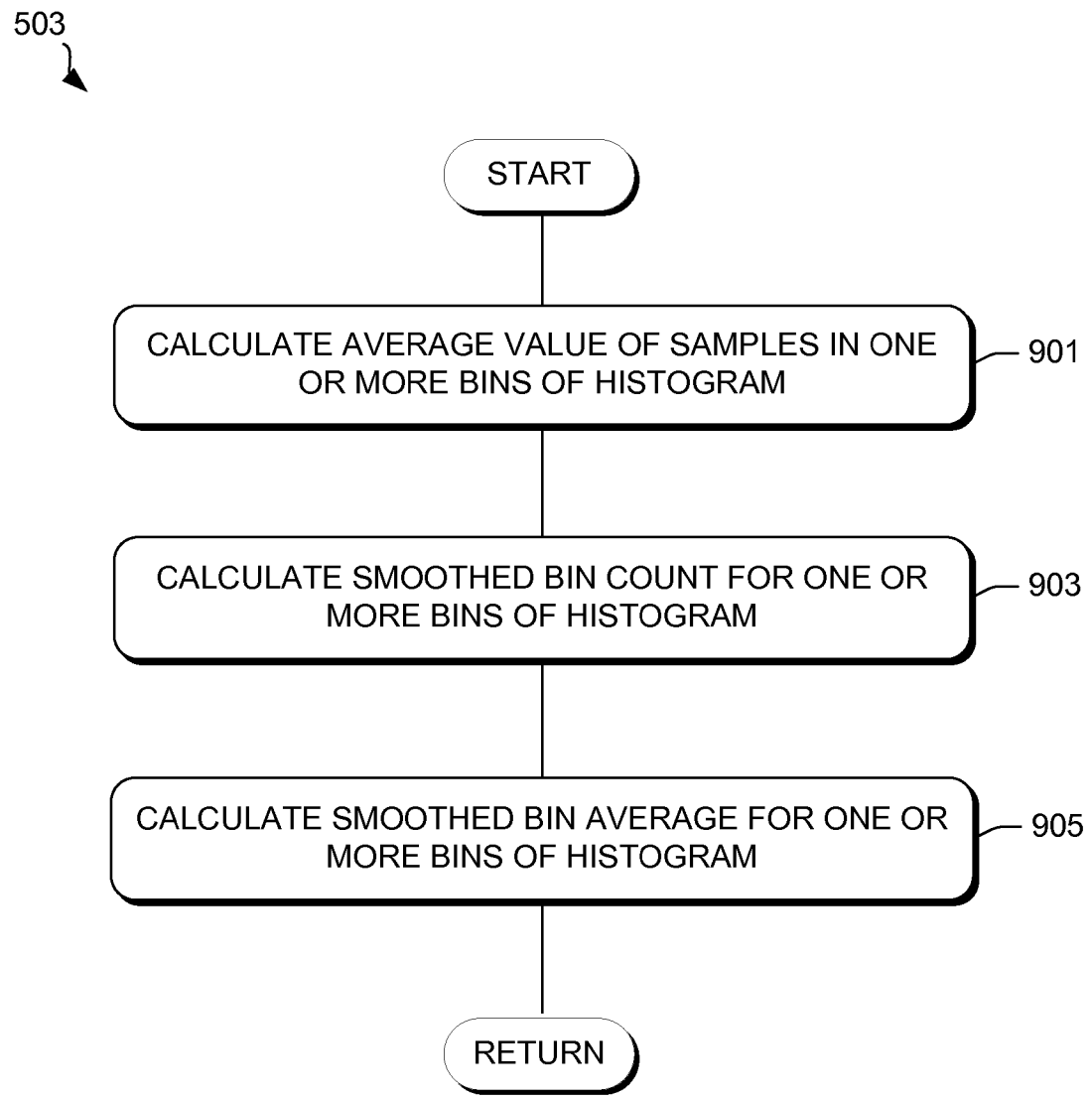
FIG. 9 and FIG. 9A are flow diagrams illustrating operational flow in spatially filtering histogram data, according to two embodiments.

FIG. 9 illustrates operational flow in spatially filtering histogram data (i.e., block 503 of FIG. 5), according to one embodiment. For clarity, the operational flow for this embodiment is described in terms spatially filtering the histogram data in response to a received packet pair. In other embodiments, several samples may be processed before spatially filtering the histogram data.

In a block 901, this embodiment of spatial filter 207 (FIG. 2) calculates an average of the samples (in kbps) for each bin of the histogram. In one embodiment, spatial filter 207 calculates the mean of the samples in each bin. Thus, using the example histogram of FIG. 8, bin 1 may have an average of 53 kbps; bin 2 may have an average of 175 kbps; bin 3 may have an average of 262 kbps; bin 4 may have an average of 329 kbps, and so on. These averages are also referred to herein as bin averages.

Returning to FIG. 9, in a block 903 this embodiment of spatial filter 207 then calculates a smoothed bin count for each bin. In one embodiment, a smoothed bin count is a weighted average of the bin count for each bin. The weighted average of the bin count of a particular bin may include the weighted or scaled bin counts of one or more bins near that bin. Further, as previously described, the bin count for a bin may be calculated using aging (see block 610 in FIG. 6A) in some embodiments.

For example, for bin 2 in FIG. 8, spatial filter 207 may calculate a weighted average using the bin counts of bin 1 and bin 3 (i.e., the adjacent bins) in addition to the bin count of bin 2 (note, other embodiments may use a different number of neighboring bins). The weighted average for a particular bin serves as its smoothed bin count. Thus, in this example, the smoothed bin count for the (N)th bin can be found using equation 1, defined as:

$$SBinCnt_N = w_1(BinCnt_{N-1}) + w2(BinCnt_N) + w3(BinCnt_{N+1}) \quad (1)$$

where $SBinCnt_N$ is the smoothed bin count for the (N)th bin; $BinCnt_{N-1}$ is the bin count for the (N−1)th bin; $BinCnt_N$ is the bin count for the (N)th bin; $BinCnt_{N+1}$ is the bin count for the (N+1)th bin; and $w_1$, $w_2$ and $w_3$ are normalized scaling factors for the (N−1)th bin, the (N)th bin and the (N+1)th bin, respectively. The scaling factors can be selected using any suitable technique such as, for example, empirical analysis or kernel density estimation techniques. Embodiments using kernel density estimation to determine the scaling factors are described below in conjunction with FIG. 11 and FIG. 11A. Although kernel density techniques are described, other embodiments may use different techniques to determine values for the scaling factors. In addition, the number and relative location of the bin(s) used in the spatial filtering calculation for a particular bin can be different in other embodiments.

This spatial filtering approach advantageously reduces the detrimental impact of a "boundary effect" that can arise in using histogram data. This boundary effect is illustrated FIG. 10 in which a relatively large number of samples are clustered at about 200 kbps (i.e., the transition point between bin 2 and bin 3). Because the samples are clustered near the transition between bins 2 and 3 and there are more samples in bin 3, the histogram inaccurately indicates that the estimated network available bandwidth has a peak somewhere near the middle of bin 3. By spatially filtering the histogram data as described above, each bin's smoothed bin count reflects the bin count(s) of bins that are nearby, thereby reducing the impact of the boundary effect.

Figure 9A:
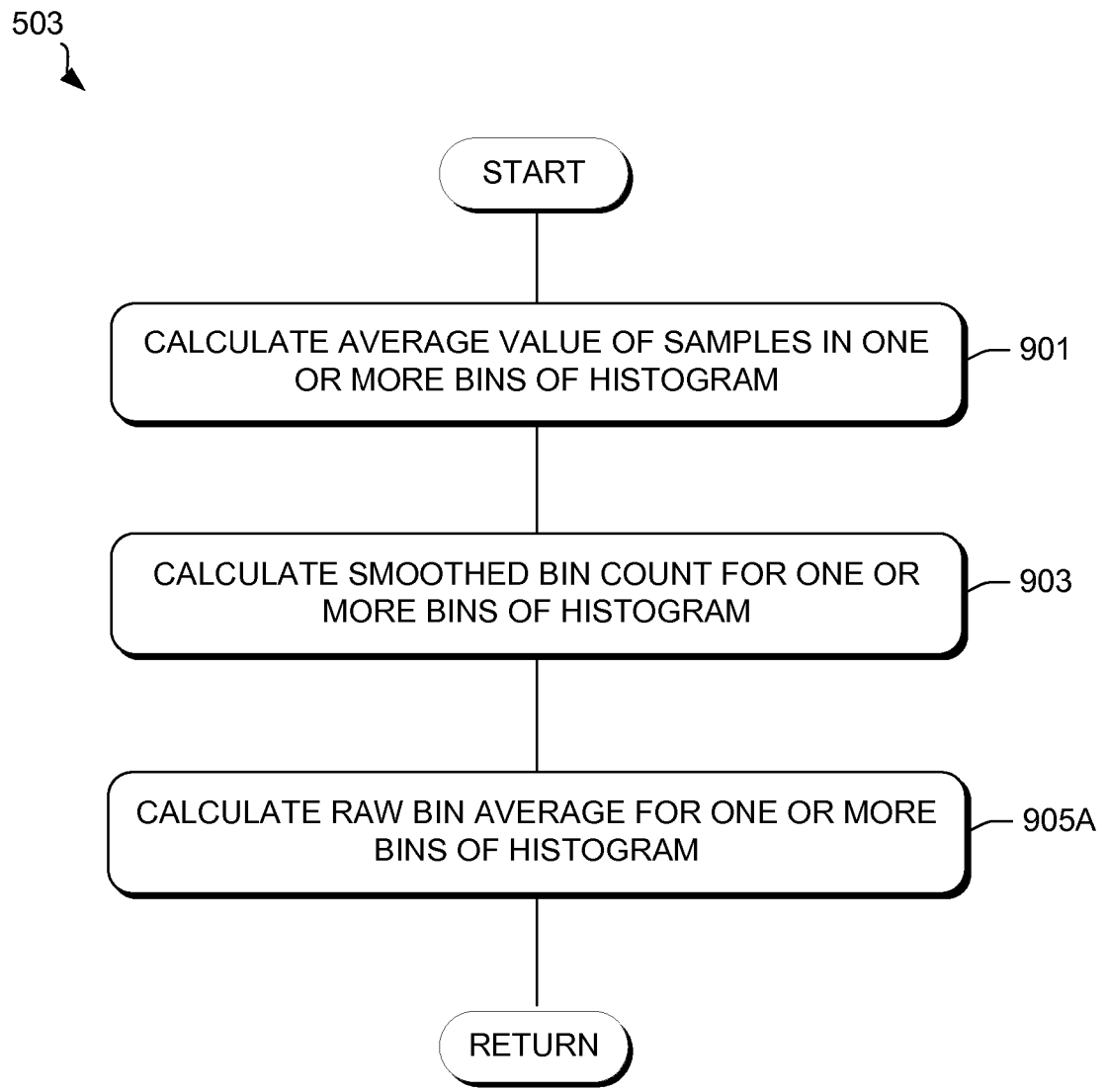
Figure 10:
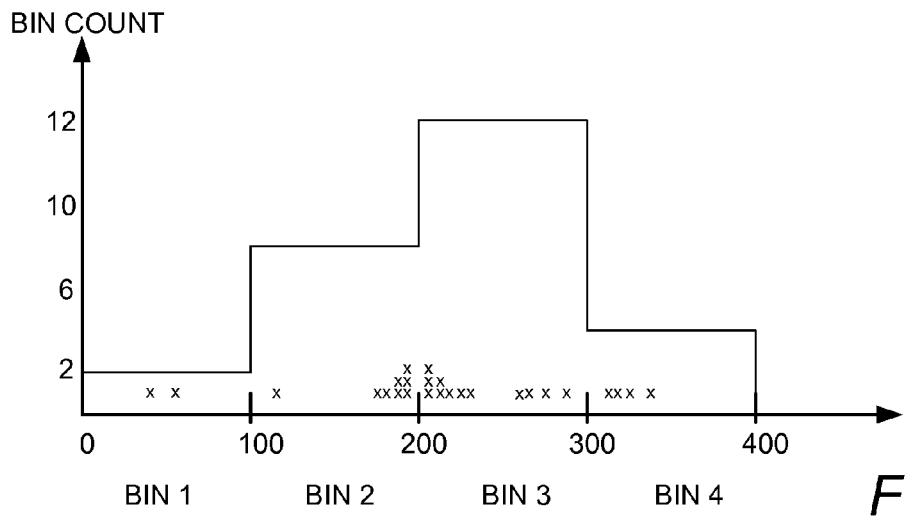
FIG. 10 is a diagram illustrating a boundary effect in a histogram of available bandwidth estimation samples derived from packet pair dispersion.

Referring again to FIG. 9, in a block 905, this embodiment of spatial filter 207 then calculates a smoothed bin average for at least one bin. For example, the smoothed bin average can be calculated for the bin that has the largest smoothed bin count. In one embodiment, the smoothed bin average of a bin may be a weighted bin average that includes the weighted bin averages of one or more bins near that bin. For example, in one embodiment, the smoothed bin averages are again calculated using kernel density estimation techniques. Blocks 901, 903 and 905 implement one approach to spatially filter the histogram data (i.e., block 503 in FIG. 5). Other approaches for spatial filtering may be used in other embodiments. For example, as shown in FIG. 9A, an alternative embodiment may perform blocks 901 and 903 as described above, but block 905 is replaced with a block 905A. In block 905A, spatial filter 207 calculates the raw (i.e., unsmoothed) bin average for at least one bin.

Figure 11:
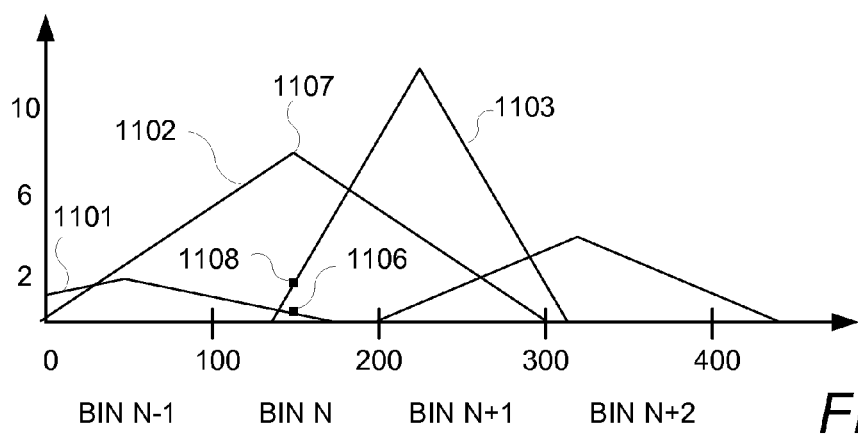
FIG. 11 and FIG. 11A are diagrams illustrating aspects of spatial filtering using kernel density algorithms, according to two embodiments.
Figure 11A:
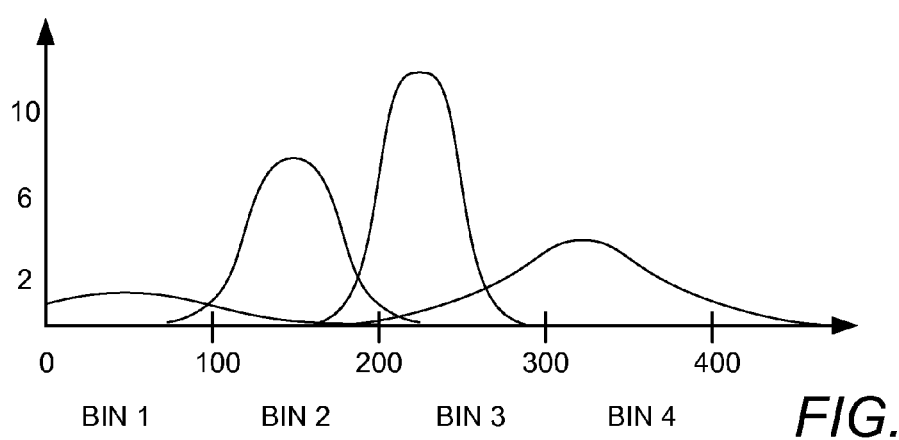

Returning to block 903 and equation 1 in particular, kernel density estimation techniques were described as being used in some embodiments to determine the scaling factors (e.g., $w_1$, $w_2$, and $w_3$ in equation 1 above) when calculating the smoothed bin count of a selected bin. FIG. 11 and FIG. 11A conceptually illustrate spatial filtering of bin counts using an algorithm based on a linear kernel and a Gaussian kernel, respectively. Other embodiments can use other types of kernels (e.g., a box kernel). The linear kernel embodiment illustrated in FIG. 11 is used to determine the scaling factors as follows.

As is well known, a linear kernel has a linearly changing density. When applied to a bin count, a linear kernel defines the "influence" that a neighboring bin has on the smoothed bin count. That is, a neighboring bin's influence decreases linearly with distance from the bin whose bin count is being smoothed. The magnitudes of the slopes depend on parameters selected for the linear kernel algorithm being used and the bin count. As shown in FIG. 11, the linear kernel density for a bin being smoothed can be represented as a triangle. In this example, the density corresponding to bin N−1 is represented by triangle 1101; the density corresponding to bin N is represented by triangle 1102; and the density corresponding to bin N+1 is represented by triangle 1103. In one embodiment, the top vertex of a bin's triangle is located at the point defined by the bin count and bin average of the bin. In other embodiments, the vertex can be located at the point defined by the bin count and the center of the bin.

Applying this linear kernel to the example spatial filtering of equation 1, scaling factor $w_1$ is determined using the density of the bin count of bin N−1 at the bin average of bin N (i.e., at point 1106 on triangle 1101). For example, in one embodiment, $w_1$ is the normalized value of the density of bin N−1 at point 1106. Similarly, in that embodiment, the value of $w_2$ is the normalized value of the density of bin N at the bin average of bin N (i.e., point 1107). Likewise, $w_3$ is the normalized value of the density of bin N+1 at the bin average of bin N (i.e., point 1108).

FIG. 11A illustrates an example using a Gaussian kernel approach. As shown in FIG. 11A, a neighboring bin's influence decreases following a bell-shaped curve with respect to distance from the bin whose bin count is being smoothed. The Gaussian curves are used to determine the values of the scaling factors in a manner substantially similar to that described above for linear kernels.

In a further refinement, some embodiments provide compensation for bins located at or near the ends of the range of interest. For example, in applying equation 1 to calculate the smoothed bin count of bin 1 (FIG. 10), there is no (N−1)th bin. Thus, in some embodiments, a compensation term is used instead of the $w_1(BinCnt_{N-1})$ term of equation 1. For example, the $w_1(BinCnt_{N-1})$ may be replaced with $w_{comp}(BinCnt_N)$, where $w_{comp}$ is a preselected scaling factor.

Figure 12:
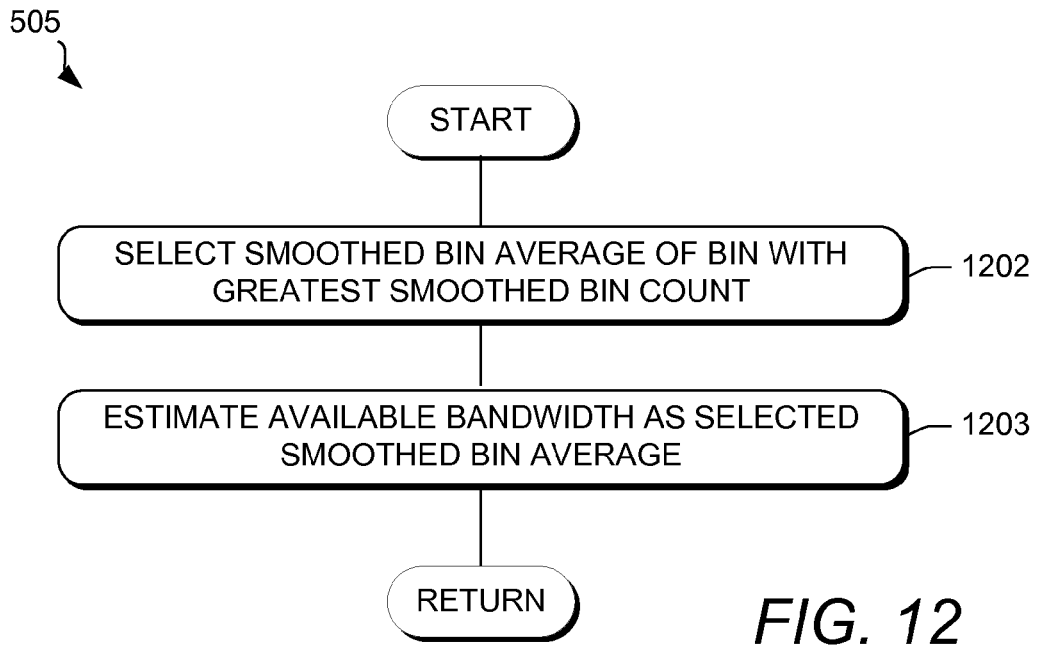
FIG. 12 through FIG. 12C are flow diagrams illustrating operational flow in determining the estimated network available bandwidth, according to four embodiments.

FIG. 12 illustrates operational flow in determining the estimated network available bandwidth (i.e., block 505 of FIG. 5), according to one embodiment. In this embodiment, in a block 1202, data destination 203 (FIG. 2) selects the smoothed bin average of the bin having the largest smoothed bin count. In a block 1203, data destination 203 then estimates the network available bandwidth as the selected smoothed bin average of block 1202. In other embodiments, additional processing may be performed on the smoothed bin average to calculate the estimated network available bandwidth. One such alternative embodiment is described below in conjunction with FIG. 12A.

Figure 12A:
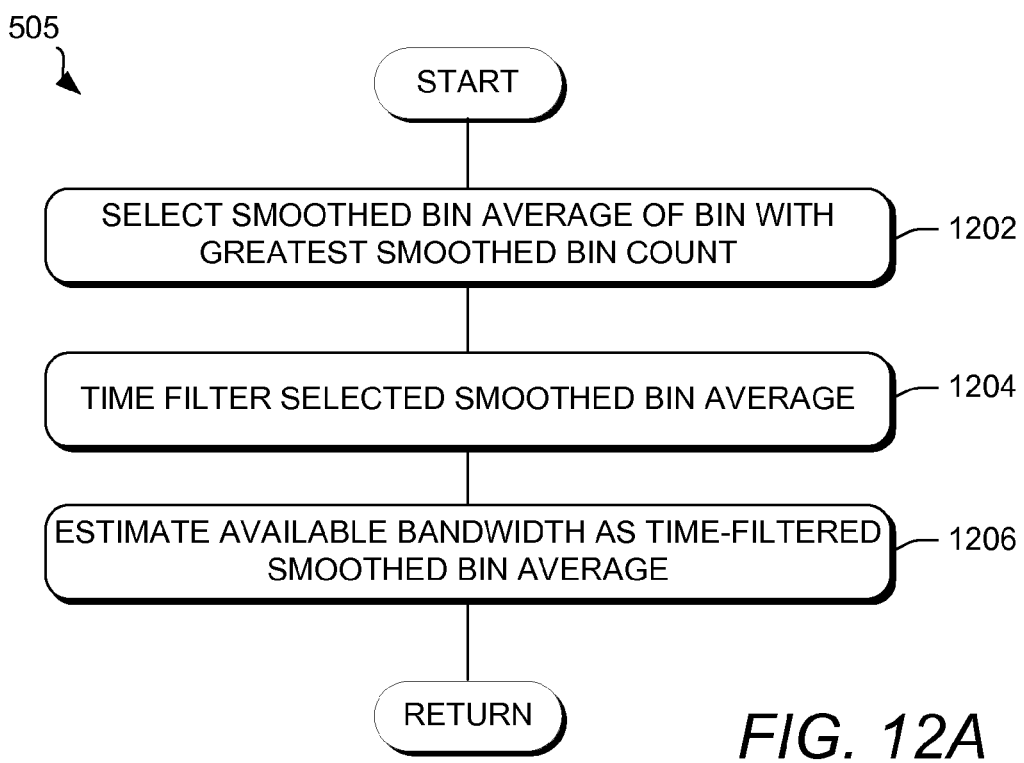

The embodiment of FIG. 12A is similar to that of FIG. 12 in that block 1202 is performed in substantially similar manner. In addition, in a block 1204, data destination 203 (FIG. 2) includes a temporal filter (not shown) that time filters the selected smoothed bin average. In one embodiment, the temporal filter time filters the selected smoothed bin average by taking an average of the currently selected smoothed bin average of block 1202 and the prior estimated network available bandwidth. That is, the most recently estimated network available bandwidth is derived from an average calculated from the smoothed bin average that was selected just prior to the currently selected smoothed bin average. The average, in one embodiment, is a weighted average with weights that depend on the whether the estimated network available bandwidth is increasing or decreasing. One implementation of time filtering is described in more detail below in conjunction with FIG. 13. Then in a block 1206, the data destination 203 then estimates the network available bandwidth as the time-filtered smoothed bin average resulting from block 1204.

Figure 12B:
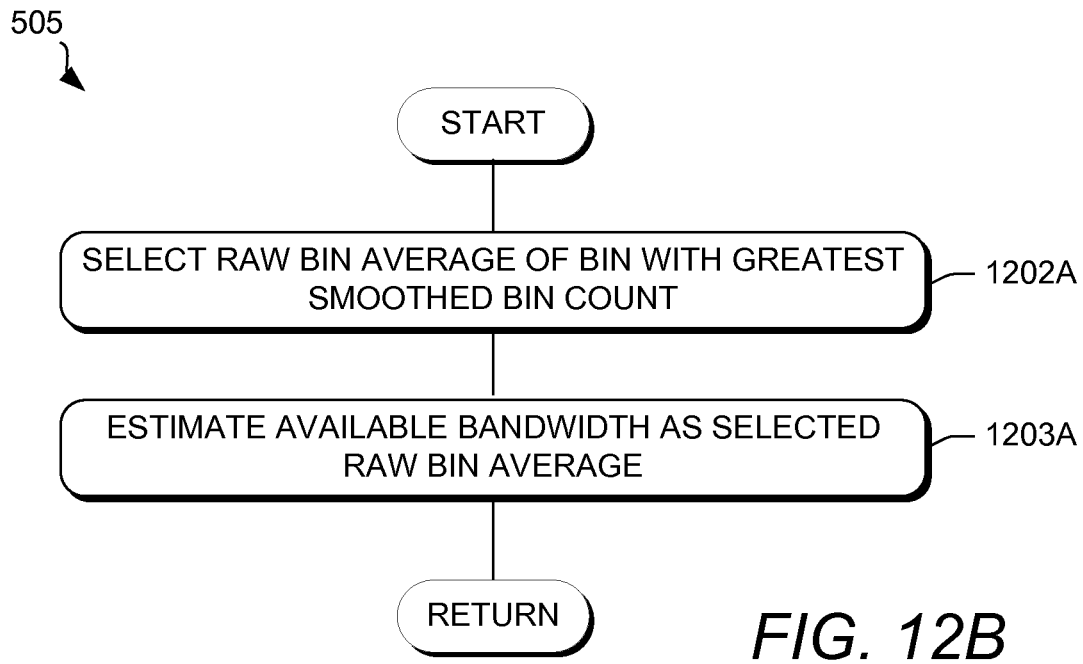

The embodiment of FIG. 12B is substantially similar to that of FIG. 12, except that block 1202 and block 1203 are replaced with blocks 1202A and 1203A, respectively. In block 1202A, data destination 203 (FIG. 2) selects the raw bin average (instead of the smoothed bin average) of the bin having the largest smoothed bin count. In block 1203A, data destination 203 estimates the network available bandwidth as the selected raw bin average of block 1202A.

Figure 12C:
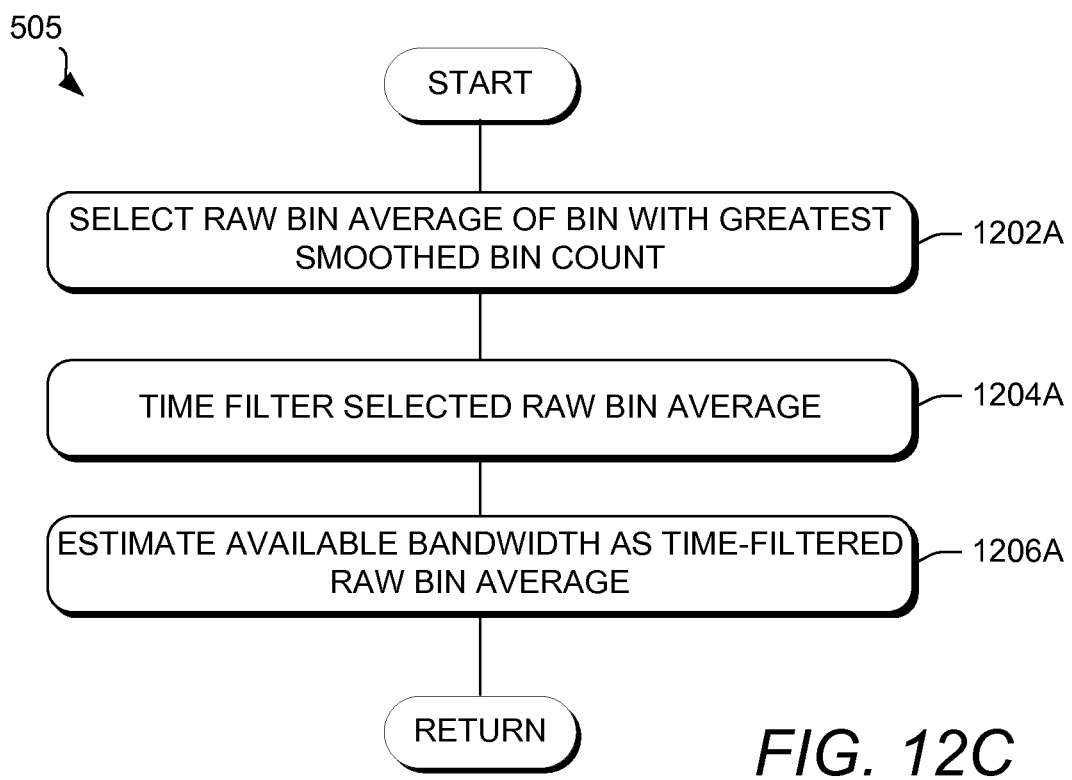

The embodiment of FIG. 12C is substantially similar to that of FIG. 12A, except that block 1202 is replaced with block 1202A (as described above), block 1204 is replaced with a block 1204A, and block 1206 is replaced with a block 1206A. In block 1204A, data destination 203 (FIG. 2) time filters the raw bin average (instead of the smoothed bin average) and the prior network available bandwidth estimation. In block 1206A, the data destination 203 then estimates the network available bandwidth as the time-filtered raw bin average resulting from block 1204A.

Figures 13, 14:
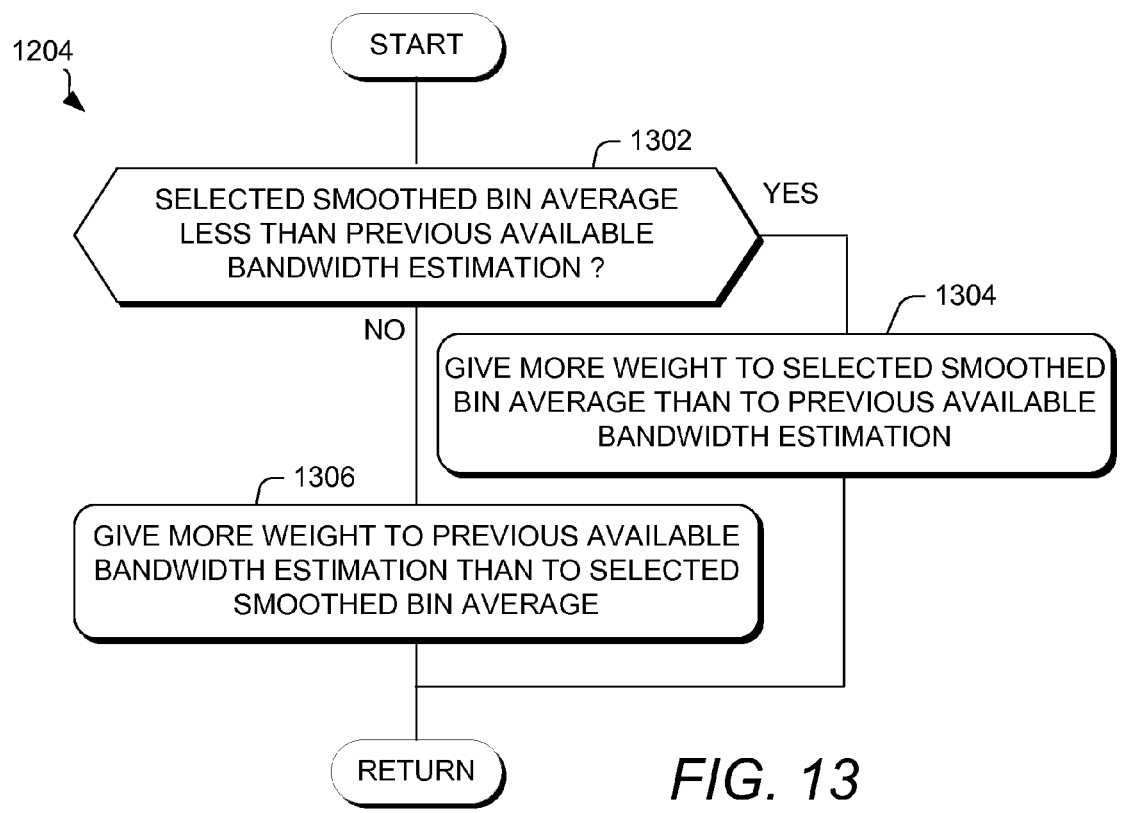
FIG. 13 is a flow diagram illustrating operational flow in time filtering a selected smooth bin average, according to one embodiment.
FIG. 14 is a diagram illustrating an example hierarchical bin structure for generating histogram data, according to an alternative embodiment.

FIG. 13 illustrates operational flow of the temporal filter described above in conjunction with block 1204 (FIG. 12), according to one embodiment. In a block 1302, in one embodiment, the temporal filter compares the currently selected smoothed bin average of block 1204 with the most recently estimated network available bandwidth. If the currently selected smoothed bin count is less than the prior estimated network available bandwidth (i.e., indicating that the bandwidth is decreasing), the temporal filter calculates the average so that more weight is given to the currently selected smoothed bin average, as indicated by a block 1304. In one embodiment, the average calculated in block 1304 uses equation 2, defined as:

$$\text{Time Average} = \alpha(EABW_{n-1}) + (1-\alpha)(SSBinAvg_n) \qquad (2)$$

where Time Average is the time average derived from the currently selected smoothed bin average, $EABW_{n-1}$ is the prior estimated network available bandwidth (i.e., corresponding to time n−1); $SSBinAvg_n$ is the currently selected smoothed bin average; and α is the weight or scaling factor. In this embodiment, α is relatively small (i.e., between 0 and 0.5). Thus, using equation 2 results in less weight being given to prior estimated network available bandwidth than to the currently selected smoothed bin count.

In contrast, if the currently selected smoothed bin count is greater than the prior estimated network available bandwidth (i.e., indicating that the bandwidth is increasing), the temporal filter calculates the average so that less weight is given to the currently selected smoothed bin average, as indicated by a block 1306. This approach causes the estimated network available bandwidth to increase relatively slowly when the bandwidth is increasing, thereby helping to prevent overestimation of the network available bandwidth. In one embodiment, the average calculated in block 1306 uses equation 3, defined as:

$$\text{Time Average} = \beta(EABW_{n-1}) + (1-\beta)(SSBinAvg_n) \quad (3)$$

where Time Average, $EABW_{n-1}$ and $SSBinAvg_n$ are defined as in equation 2 above, and β is a relatively large (i.e., between 0.5 and 1) weight or scaling factor. Thus, using equation 3 results in greater weight being given to prior estimated network available bandwidth than to the currently selected smoothed bin count. This approach causes the estimated network available bandwidth to decrease relatively quickly when the bandwidth is decreasing, which also helps prevent overestimation of the network available bandwidth. Using equations 2 and 3 in this manner can be advantageously used in real time or streaming audio and video applications to prevent choppy and blocky output caused by overestimation of network available bandwidth. In one embodiment, α and β are determined empirically. In other embodiments, training techniques can be used to adaptively determine values for α and β. In addition, in other embodiments, different time filtering approaches (i.e., other than equations 2 and 3) can be used.

FIG. 14 illustrates a hierarchical bin structure for generating histogram data, according to one embodiment. In one embodiment, the hierarchical bin structure includes three levels 1401 through 1403. Other hierarchical embodiments may have a different number of levels.

In the first level (i.e., level 1401), the estimated available bandwidth sample range is partitioned into a relatively small number of large bins. In the example shown in FIG. 14, the range is divided into five bins of uniform 1200 kbps bin widths, indicated as $bin_{11}$, $bin_{12}$, $bin_{13}$, $bin_{14}$, and $bin_{15}$. In other embodiments, the first level bins may have a different number of bins, bins of different uniform bin widths, non-uniform bin widths, etc., than shown in FIG. 14.

Second level bins 1402 have smaller bin widths that the bins of first level 1401. In this example embodiment, only $bin_{11}$ has bins in second level 1402. In particular, $bin_{11}$ is further divided into second level bins of having uniform 300 kbps bin widths. In this example, $bin_{11}$ has second level bins consisting of $bin_{21}$, $bin_{22}$, $bin_{23}$ and $bin_{24}$. In other embodiments, the second level bins may have a different number of bins, bins of different uniform bin widths, non-uniform bin widths, etc., than shown in FIG. 14. In still other embodiments, $bin_{11}$ may or may not have second level bins with other bin(s) of first level 1401 having second level bins.

Third level bins 1403 have smaller bin widths than the bins of second level 1402. In this example, only $bin_{21}$ has bins in third level 1403. In particular, $bin_{21}$ is divided into third level bins having uniform 100 kbps bin widths. In this example, $bin_{21}$ has third level bins consisting of $bin_{31}$, $bin_{32}$, and $bin_{33}$. In other embodiments, the third level bins may have a different number of bins, bins of different uniform bin widths, non-uniform bin widths, etc., than shown in FIG. 14. In still other embodiments, $bin_{21}$ may or may not have third level bins with other bin(s) of second level 1402 having third level bins.

This hierarchical bin structure allows higher resolution of the network available bandwidth estimation at selected bandwidth ranges (i.e., at a selected bin or bins), while allowing lower resolution (and less computation) at the remaining bandwidth ranges. To get higher resolution at a selected bandwidth range, the first level bin(s) containing the selected bandwidth range would include second level bins. To get even more resolution, selected second level bin or bins would have third level bins. This feature can be advantageously used in real time or streaming audio and video applications to provide higher resolution near the bandwidth ranges where codecs would be changed. At bandwidth ranges in which the codec is not likely to change, a low resolution (e.g. only first level bins) could be used to reduce the computational load.

Figure 15:
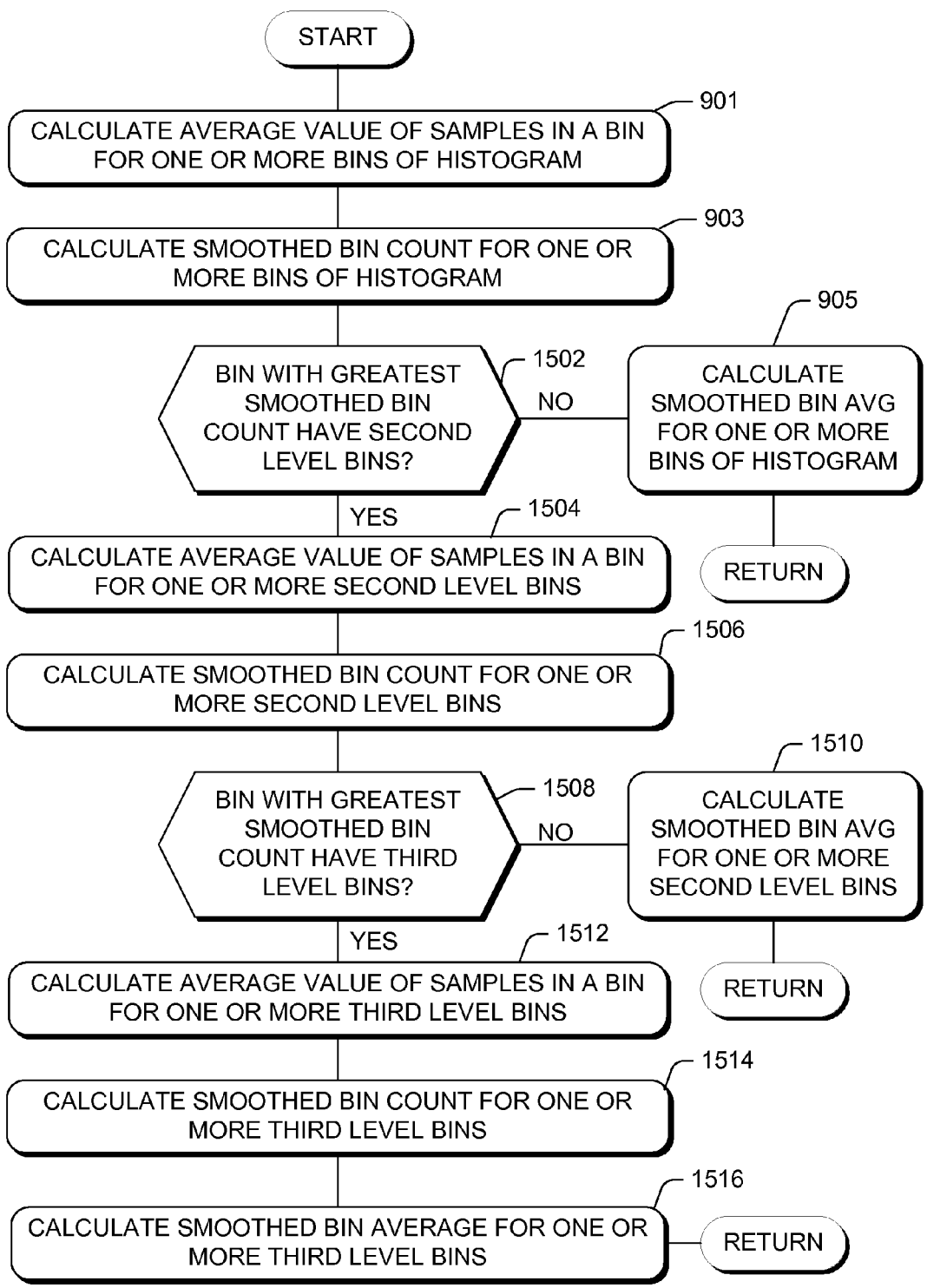
FIG. 15 and FIG. 15A are flow diagrams illustrating operational flow in spatial filtering hierarchical histogram data, according to two embodiments.

FIG. 15 illustrates operational flow in spatial filtering hierarchical histogram data, according to one embodiment. That is, FIG. 15 illustrates operational flow of spatial filter 205 (FIG. 2) in performing block 503 (FIG. 5) on the hierarchical bin data. In this embodiment, spatial filter 205 performs block 901 (FIG. 9) and block 903 (FIG. 9) as previously described using the first level bins.

In a block 1502, spatial filter 205 then determines whether the first level bin with the highest smoothed bin count has second level bins. If not, then spatial filter 205 performs block 905 (FIG. 9) as previously described using the first level bins. However, if the first level bin with the highest smoothed bin count does have second level bins, the operational flow then proceeds to a block 1504.

Block 1504 is substantially similar to block 901 except that block 1504 calculates the average of the samples of the second level bins of first level bin having the highest smoothed bin count. Otherwise, in this embodiment, block 1504 is performed in substantially the same manner as previously described for block 901. The operational flow then proceeds to a block 1506.

Block 1506 is substantially similar to block 903, except that block 1506 calculates the smoothed bin count of the second level bins of the first level bin having the highest smoothed bin count. Otherwise, in this embodiment, block 1506 is performed in substantially the same manner as previously described for block 903.

In a block 1508, spatial filter 205 in this embodiment then determines whether the second level bin with the highest smoothed bin count (from block 1506) has third level bins. If not, then spatial filter 205 performs a block 1510 to calculate the smoothed bin average(s). Block 1510 is substantially similar to block 905 except that block 1510 calculates the smoothed bin average(s) of the selected second level bins. However, if in block 1508 the second level bin with the highest smoothed bin count does have third level bins, the operational flow then proceeds to a block 1512.

Block 1512 is substantially similar to block 901 except that block 1512 calculates the average of the samples of the third level bins of second level bin having the highest smoothed bin count. Otherwise, in this embodiment, block 1512 is performed in substantially the same manner as previously described for block 901. The operational flow then proceeds to a block 1514.

Block 1514 is substantially similar to block 903, except that block 1514 calculates the smoothed bin count of the third level bins of the second level bin having the highest smoothed bin count. Otherwise, in this embodiment, block 1514 is performed in substantially the same manner as previously described for block 903.

In a block 1516, spatial filter 205 then calculates the smoothed bin average(s) of the third level bins of the second level bin having the highest smoothed bin count. Block 1516 is substantially similar to block 905 except that block 1516 calculates the smoothed bin average(s) of the selected second level bins.

Figure 15A:
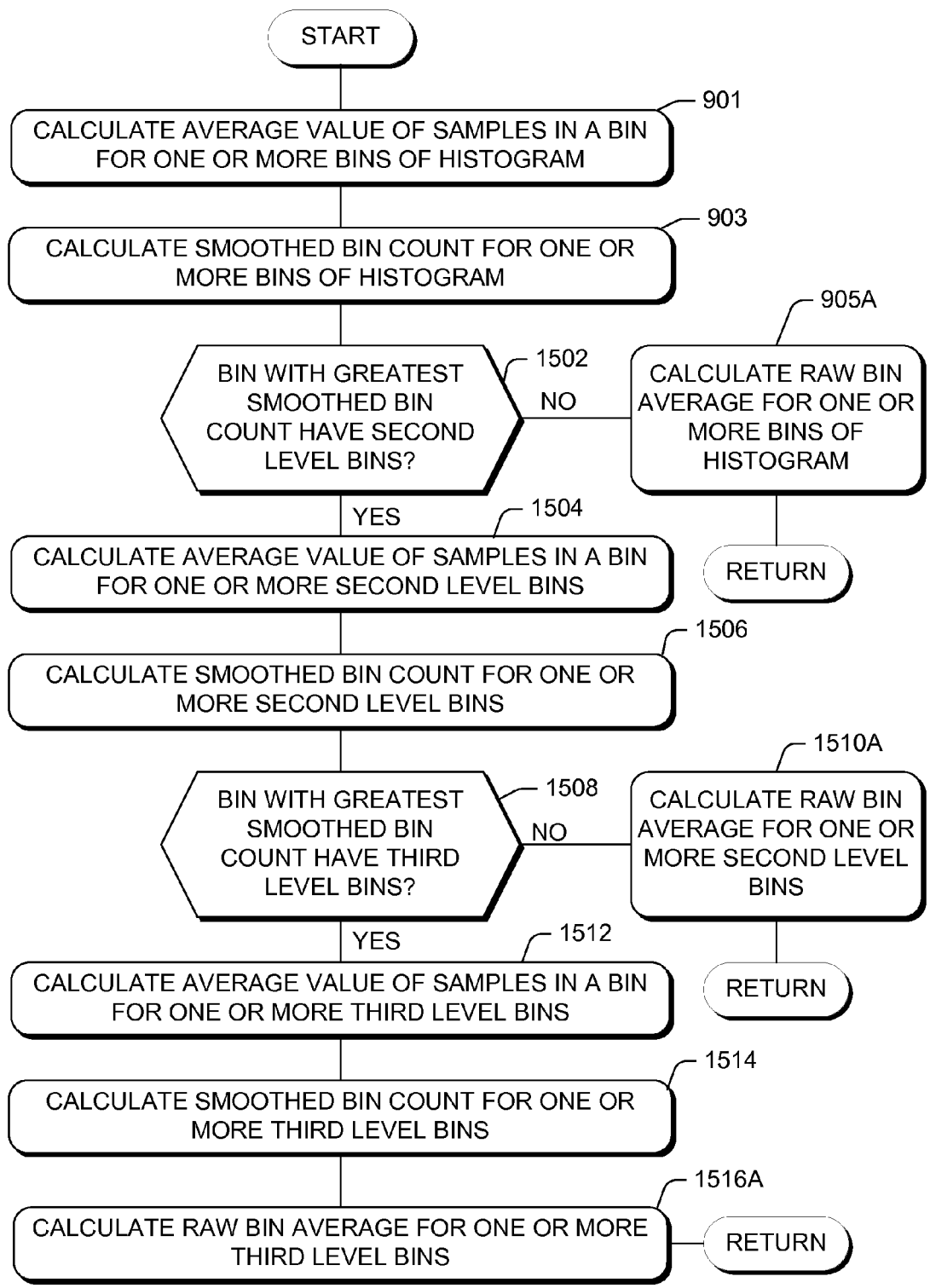

FIG. 15A illustrates operational flow in spatial filtering hierarchical histogram data, according to another embodiment. This embodiment is substantially similar to the embodiment of FIG. 15 except that block 905, block 1510 and block 1516 are replaced with block 905A, a block 1510A and a block 1516A. Blocks 1510A and 1516A are similar to blocks 1510 and 1516 as described above in conjunction with FIG. 15, except that the raw bin average is used instead of a smoothed bin average.

Figure 16:
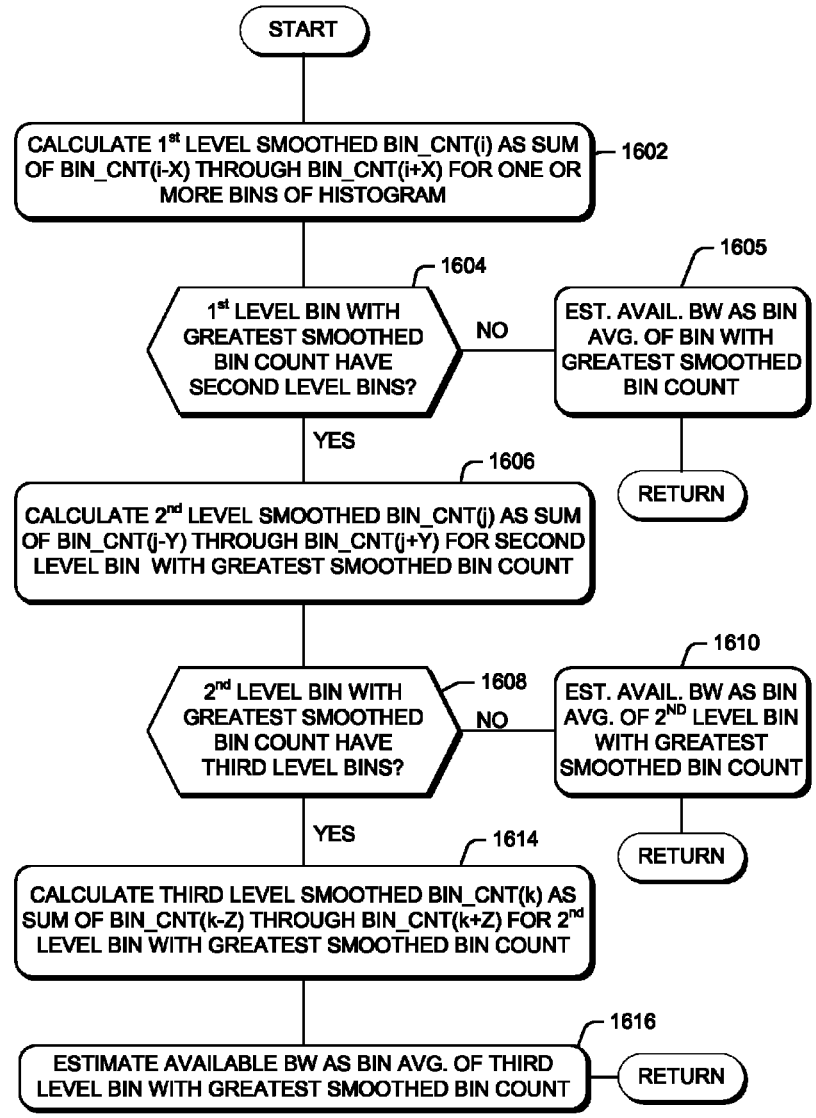
FIG. 16 is a flow diagram illustrating operational flow in spatial filtering hierarchical histogram data, according to another embodiment.

FIG. 16 illustrates operational flow in spatial filtering hierarchical histogram data, according to yet another embodiment. In this embodiment, spatial filter 205 (FIG. 2) performs a block 1602 to calculate the smoothed bin counts of one or more first level bins by summing the bin counts of a bin and a predetermined number of higher bandwidth bins. More particularly, the smoothed first level bin count(s) are calculated in block 1602 using equation 4, defined as:

$$\text{SBin\_Cnt}(i) = \text{Bin}_{Cnt}(i-X) + \text{Bin\_Cnt}(i-X-1) + \ldots + \text{Bin\_Cnt}(i+X) \quad (4)$$

where SBin_Cnt(i) is the smoothed bin count of the ith first level bin, and Bin_Cnt(i−X), Bin_Cnt(i−X−1), ..., Bin_Cnt(i+X)) are the bin counts of the (i−X)th bin through (i+X)th bin, respectively. This approach, in effect, creates overlapping first level bins having a bin width of (1+2X) bins. In one example implementation, the bandwidth range is divided into one hundred bins of 100 kbps binwidth, and X is set to 5. The first level bins range from bin 6 to bin 95. Thus, for the "first" bin in the first level (i.e., bin 6), the smoothed bin count would be the sum of the bin counts of bin 1 through bin 11. Similarly, the smoothed bin count for the second bin (i.e., bin 7) would be the sum of bin 2 through bin 12, and so on.

In a decision block 1604, spatial filter 205, in this embodiment, determines whether the first level bin with the highest smoothed bin count has second level bins. In one embodiment, all of the first level bins up to the first level bin centered on the 900 kbps-1 Mbps bin have second level bins. In other embodiments, different first level bins may have second level bins. If the first level bin with the highest bin count does not have second level bins, then spatial filter 205 performs a block 1605. In block 1605, the network available bandwidth is estimated as the bin average (can be smoothed or non-smoothed) of the bin of the first level bin with the greatest smoothed bin count. However, if the first level bin with the highest smoothed bin count does have second level bins, the operational flow then proceeds to a block 1606.

In block 1606, in this embodiment, spatial filter 205 calculates the smoothed bin counts of second level bins by summing the bin counts of each bin within the first level bin with a predetermined number of neighboring bins. More particularly, the smoothed bin count(s) calculated in block 1606 uses equation 5, defined as:

$$\text{SBin\_Cnt}(j) = \text{Bin\_Cnt}(j-Y) + \text{Bin\_Cnt}(j-Y-1) + \ldots + \text{Bin\_Cnt}(j+Y) \quad (5)$$

where SBin_Cnt(j) is the smoothed bin count of the jth second level bin and Bin_Cnt(j−Y), Bin_Cnt(j−Y−1), ..., Bin_Cnt(j+Y)) are the bin counts of the (j−Y)th bin through (j+Y)th bin, respectively. This approach, in effect, creates overlapping second level bins having a bin width of (1+2Y) bins. Equation 5 is similar to equation 4, but in this embodiment, Y is less than X. In one example implementation, Y is set to 2. Continuing the example above, if the first level centered on bin 8 has the greatest smoothed bin count, its second level bins range from bin 3 to bin 13. Thus, for the "first" bin in the second level bin (i.e., the second level bin centered on bin 3), the smoothed bin count would be the sum of the bin counts of bin 1 through bin 5. Similarly, the smoothed bin count for the second bin (i.e., the second level bin centered on bin 4) would be the sum of bin 2 through bin 6, ..., and the smoothed bin count for the eleventh bin (i.e., the second level bin centered on bin 13) would be the sum of the bin counts of bin 11 through bin 15. Thus, bins 1-5 now contribute to the smoothed bin counts even though they did not with respect to the first level bins.

In a decision block 1608, spatial filter 205 determines whether the second level bin with the highest smoothed bin count has third level bins. If not, then spatial filter 205 performs a block 1610 in which the network available bandwidth is estimated as the bin average (can be smoothed or non-smoothed) of the bin of the second level bin with the greatest smoothed bin count. However, in this embodiment if the second level bin with the highest smoothed bin count does have third level bins, the operational flow then proceeds to a block 1614.

In block 1614, spatial filter 205 calculates the smoothed bin counts of the third level bins by summing the bin counts of each bin in the second level bin with the highest smoothed bin count with a predetermined number of neighboring bins. More particularly, the smoothed bin count(s) calculated in block 1614 uses equation 6, defined as:

$$\text{SBin\_Cnt}(k) = \text{Bin\_Cnt}(k-Z) + \text{Bin\_Cnt}(k-Z-1) + \ldots + \text{Bin\_Cnt}(k+Z) \quad (6)$$

where SBin_Cnt(k) is the smoothed bin count of the kth second level bin, and Bin_Cnt(k−Z) through Bin_Cnt(k+Z) are the bin counts of the (k−Z)th bin through (k+Z)th bin, respectively. This approach, in effect, creates overlapping third level bins having a bin width of (1+2Z) bins. Equation 6 is similar to equation 5, but in this embodiment, Z is less than Y. In one example implementation, Z is set to zero. Continuing the example above, if the first bin of the second level bin (i.e., the second level bin centered on bin 3) has the greatest smoothed bin count, because Z is zero, the third level bins range from bin 1 to bin 5. The smoothed bin count of the "first" bin in the third level bin (i.e., bin 1) would simply be the bin count of bin 1. Similarly, the smoothed bin count for the second bin (i.e., bin 2) would be the bin count of bin 2, and so on.

In a block 1616, spatial filter 205 estimates the network available bandwidth as the bin average (smoothed or unsmoothed) of the bin of the third level bin having the greatest smoothed bin count. This embodiment has a three level hierarchy; however, other embodiments may have a different number of levels.

Figure 17:
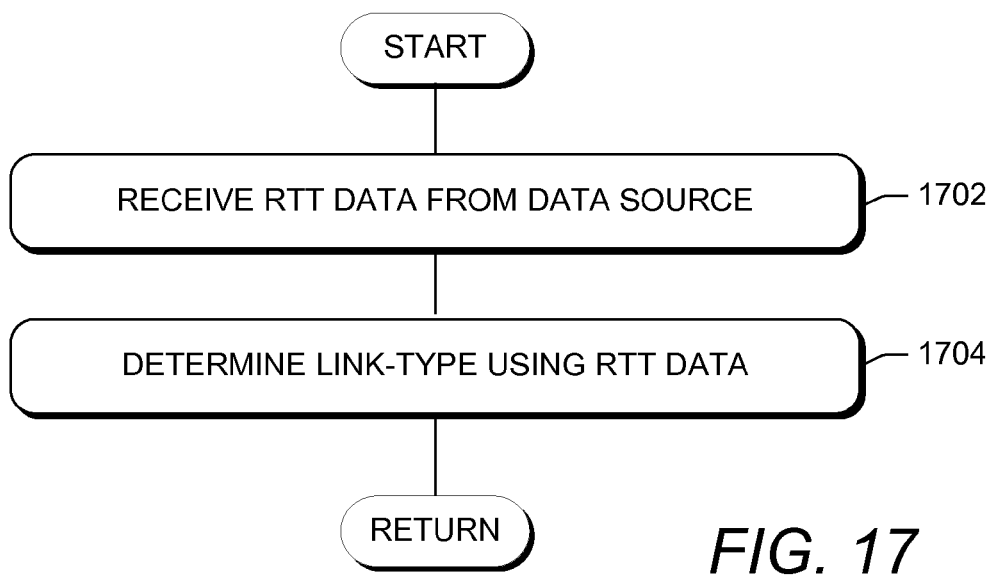
FIG. 17 is a flow diagram illustrating operational flow in determining network connection type using round trip time, according to one embodiment.

FIG. 17 illustrates operational flow in determining the type of network connection between the data source and the data destination. In this embodiment, data destination 203 (FIG. 2) receives round trip time (RTT) from data source 201 (FIG. 2). Although part of the aforementioned RTP Standard, a brief description of RTCP (which is part of the RTP Standard) messages is provided below.

RTT information is available to data source 201 when transmitting data/messages over network 105 (FIG. 2)

according to the aforementioned RTP Standard. Thus, in one embodiment, data source 201 sends RTCP messages containing RTT information to data destination 203 in the form of packet pairs. In a block 1702, data destination 203 receives the packet pairs containing the RTT information. In addition, in this embodiment, data destination 203 uses these packet pairs to determine an estimated network available bandwidth samples (as previously described in conjunction with block 603 in FIG. 6).

Figure 18:
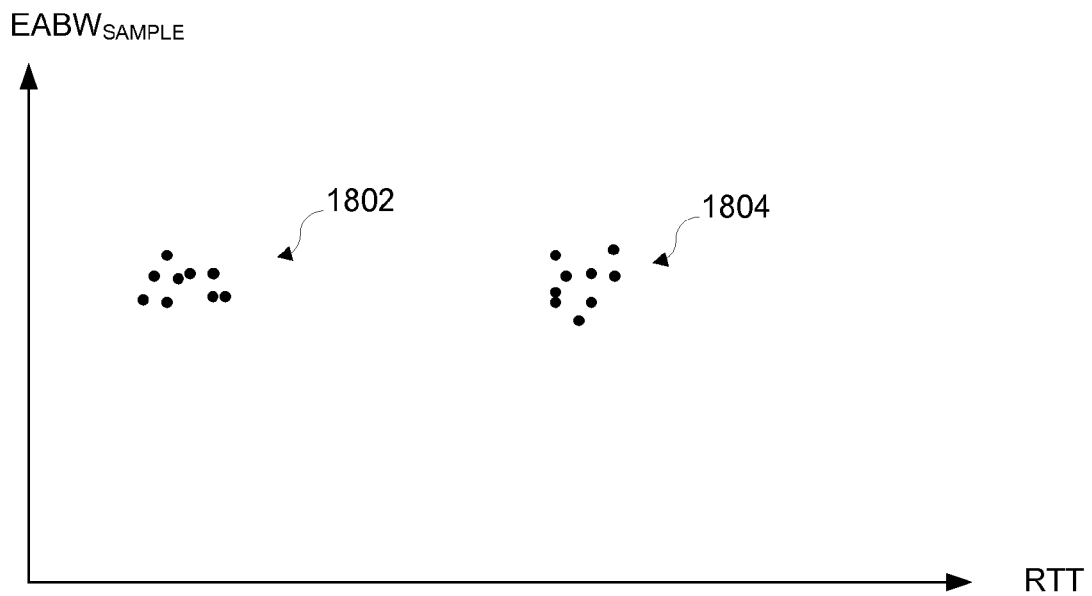
FIG. 18 is a diagram illustrating an exemplary round trip time distribution.

In a block 1704, data destination 203 then determines the type of network connection being used to transmit the packet pairs (and thus, normal data) from data source 210 to data destination 203. For example, the network connection may be a digital subscriber line (DSL) or a local area network (LAN) or other type of network connection. In one embodiment, data destination 203 determines the estimated network available bandwidth sample from each packet pair, and associates the sample value with the RTT contained in the packet pair. Using an empirical analysis, data destination 203 can categorize the network connection. For example, FIG. 18 illustrates an example of the distribution of estimated network available bandwidth samples as a function of their associated RTTs. The samples indicated by arrow 1802 represent the packet pairs transmitted via a LAN network connection. The samples indicated by arrow 1804 represent the packet pairs transmitted via a DSL network connection. In this example, the packets have roughly the same estimated network available bandwidth samples; therefore discrimination of the network connection cannot be based on the sample values alone. The RTT provides another dimension so that data destination 203 can determine the type of network connection being used by the data destination. Data destination 203 can then provide this network connection information to data source 201. Data source 201 can then use this information to help determine an optimal data transmission bandwidth.

As previously described, the above embodiments may be practiced using computers such as, for example, personal computers, main frame computers, and other machines or computing devices that include one or more processors such as general purpose microprocessors, application specific processors, microcontrollers, etc.

Implementations of the above-described embodiments may be stored on or transmitted across some form of computer readable media. Computer readable media can be any available media that can be accessed by a computer. By way of example, and not limitation, computer readable media may include "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, and program modules. Communication media also includes any information delivery media. As a non-limiting example only, communication media includes wired media such as a wired network or direct-wired connection. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention.

What is claimed is:

1. A method to discriminate between different types of network connections, the method comprising:
   receiving a packet pair from a network, wherein the packet pair includes round trip time (RTT) information;
   estimating available bandwidth in the network as a function of a dispersion of the received packet pair; and
   determining a network connection type from a predetermined set of network connection types based at least in part on a comparison of known relationships between the RTT and the estimated available bandwidth that categorize the predetermined set of network connection types.

2. The method of claim 1 wherein the packet pair conforms with a Real-time Transport Control Protocol (RTCP) and is injected in a data stream conforming with a Real-time Transport Protocol (RTP).

3. A computer readable storage device having instructions for performing the method recited in claim 1.

4. The method of claim 1, further comprising providing the estimated available bandwidth to a source of the packet pair.

5. The method of claim 1, further comprising providing the network connection type to a source of the packet pair.

6. The method of claim 1, wherein the dispersion is a time difference between two packets of the packet pair.

7. The method of claim 1, wherein the packet pair further includes timing information that differs from the RTT information.

8. The method of claim 7, further comprising determining the dispersion from the timing information.

9. The method of claim 1, wherein the predetermined set of network connection types comprise a digital subscriber line (DSL) or a local area network (LAN).

10. A system for discriminating between different types of network connections, the system comprising:
    memory;
    one or more processors;
    instructions stored in the memory that are executable by the one or more processors, the instructions configured to:
       receive a packet pair from a network, wherein the packet pair includes round trip time (RTT) information;
       estimate an available bandwidth in the network as a function of a dispersion of the received packet pair; and determine a network connection type of a source of the packet pair based at least in part on a comparison of known relationships between the RTT and the estimated available bandwidth for a set of network connection types.

11. The system of claim 10 wherein the packet pair conforms with a Real-time Transport Control Protocol (RTCP) and is inserted in a data stream conforming with a Real-time Transport Protocol (RTP).

12. The system of claim 10, wherein the packet pair further includes timing information that differs from the RTT information.

13. The system of claim 12, the instructions further configured to determine the dispersion from the timing information.

14. The system of claim 10, the instructions further configured to provide the estimated available bandwidth to the source of the packet pair.

15. The system of claim 10, the instructions further configured to provide the network connection type to the source of the packet pair.

16. The system of claim 10, wherein the predetermined set of network connection types comprise a digital subscriber line (DSL) or a local area network (LAN).

17. A computer readable storage device comprising machine-readable instructions that, when executed by one or more processors, perform acts comprising:
    receiving a packet pair from a network, wherein the packet pair includes round trip time (RTT) information;
    estimating available bandwidth in the network as a function of a dispersion of the received packet pair; and
    determining a network connection type of a source of the packet pair based at least in part on an analysis of known relationships between the dispersion and the RTT.

18. The computer readable storage medium of claim 17, wherein the packet pair conforms with a Real-time Transport Control Protocol (RTCP) and is inserted in a data stream conforming with a Real-time Transport Protocol (RTP).

19. The computer readable storage medium of claim 17, wherein the network connection type comprises at least one of a digital subscriber line (DSL), a local area network (LAN) or other type of network connection.

* * * * *